Figure 1:
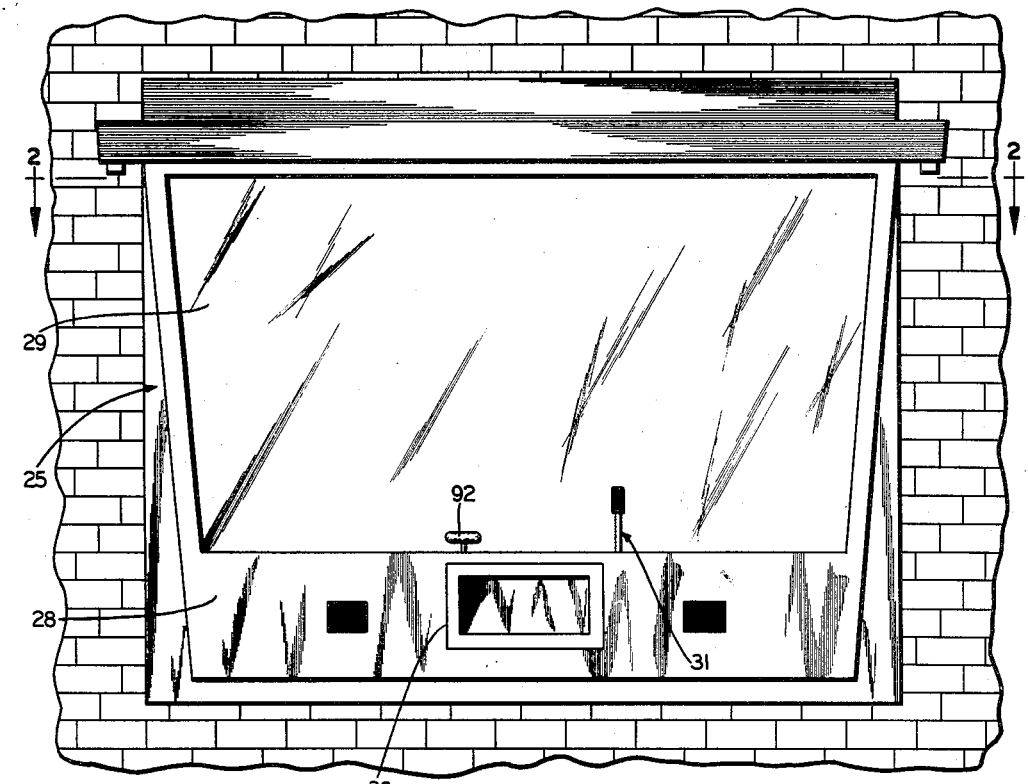

Aug. 23, 1960  C. D. GRABER  2,949,870
DEAL DRAWER CONSTRUCTION FOR BANK DRIVE-UP WINDOWS
Filed July 17, 1957  7 Sheets-Sheet 1

INVENTOR.
CARL D. GRABER
BY Frease & Bishop
ATTORNEYS

Aug. 23, 1960    C. D. GRABER    2,949,870
DEAL DRAWER CONSTRUCTION FOR BANK DRIVE-UP WINDOWS
Filed July 17, 1957    7 Sheets-Sheet 2

INVENTOR.
CARL D. GRABER
BY Frease & Bishop
ATTORNEYS

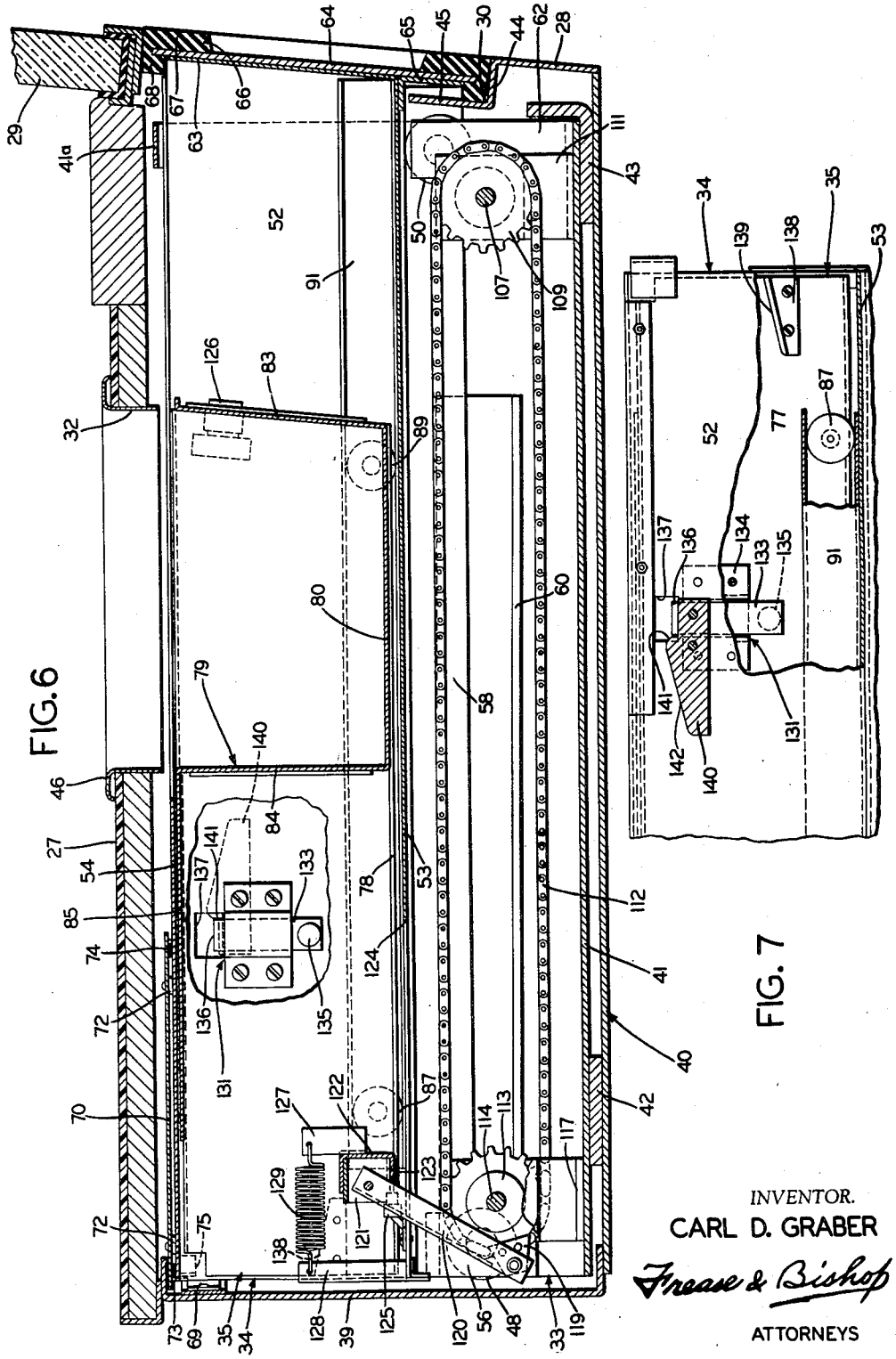
Aug. 23, 1960 — C. D. GRABER — 2,949,870
DEAL DRAWER CONSTRUCTION FOR BANK DRIVE-UP WINDOWS
Filed July 17, 1957 — 7 Sheets-Sheet 3
INVENTOR.
CARL D. GRABER
Frease & Bishop
ATTORNEYS

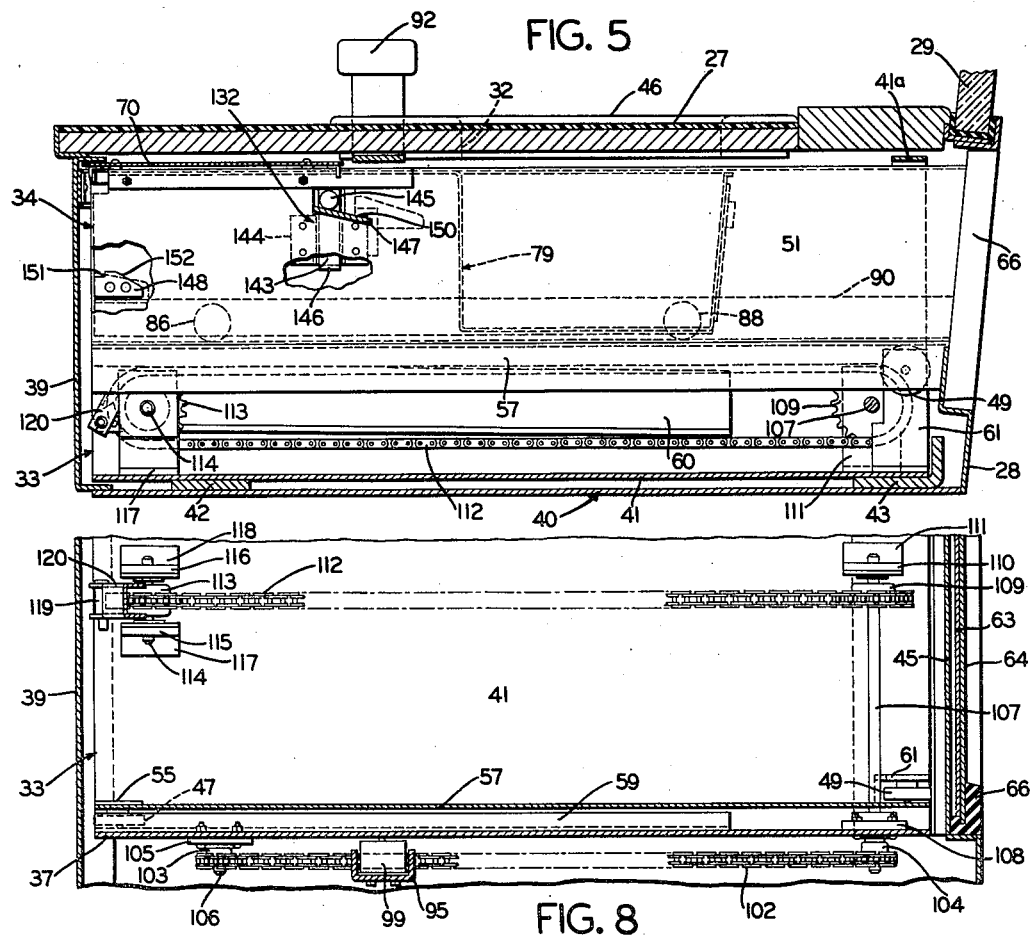
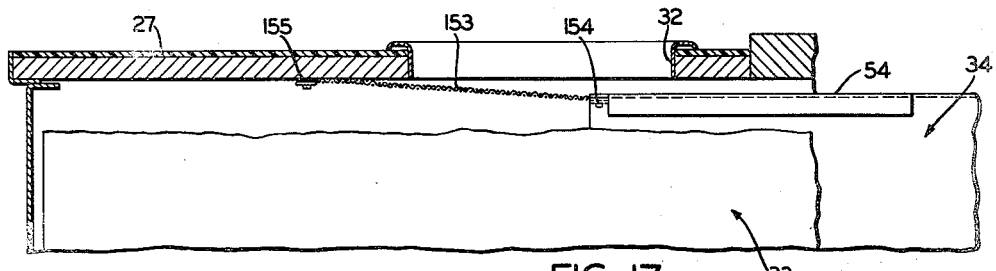
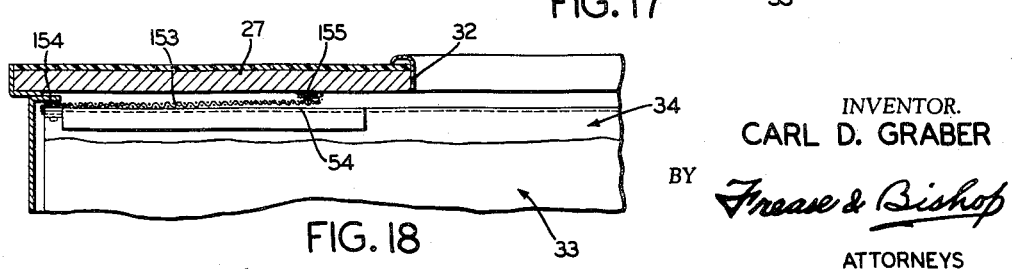

Aug. 23, 1960 C. D. GRABER 2,949,870
DEAL DRAWER CONSTRUCTION FOR BANK DRIVE-UP WINDOWS
Filed July 17, 1957 7 Sheets-Sheet 5
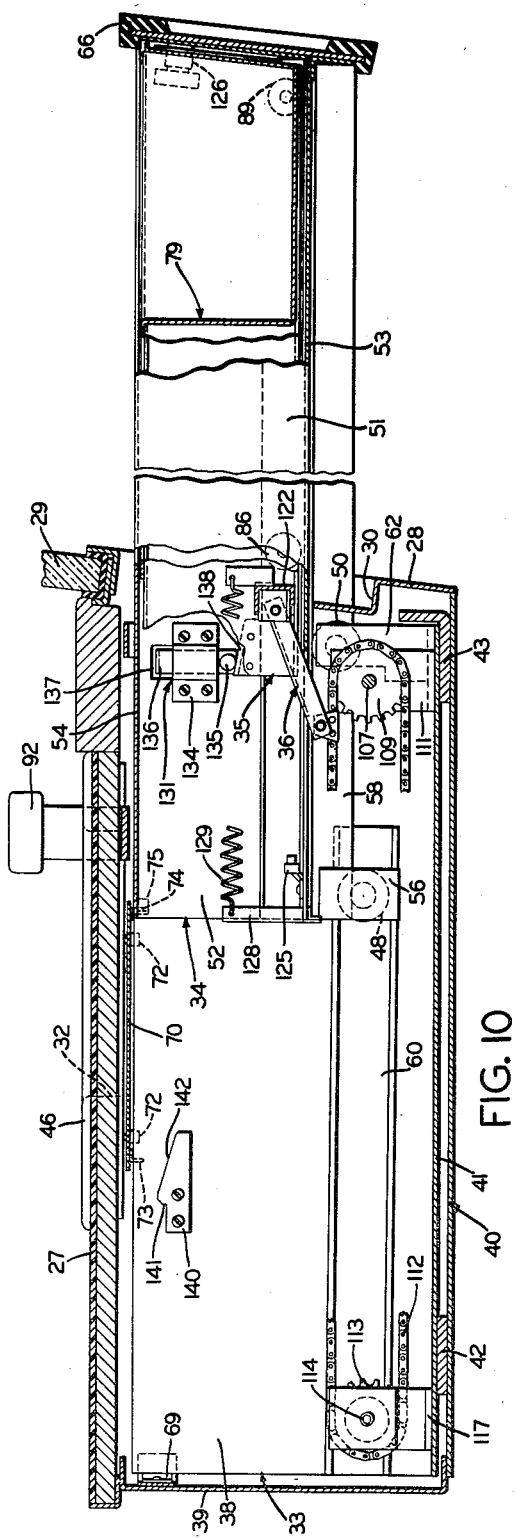
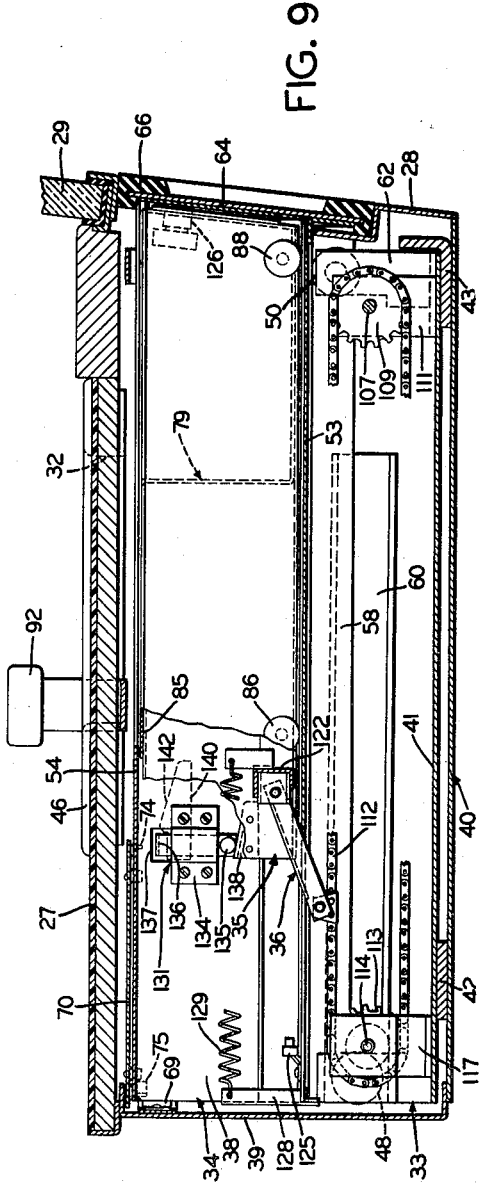
INVENTOR.
CARL D. GRABER
BY
*Frease & Bishop*
ATTORNEYS

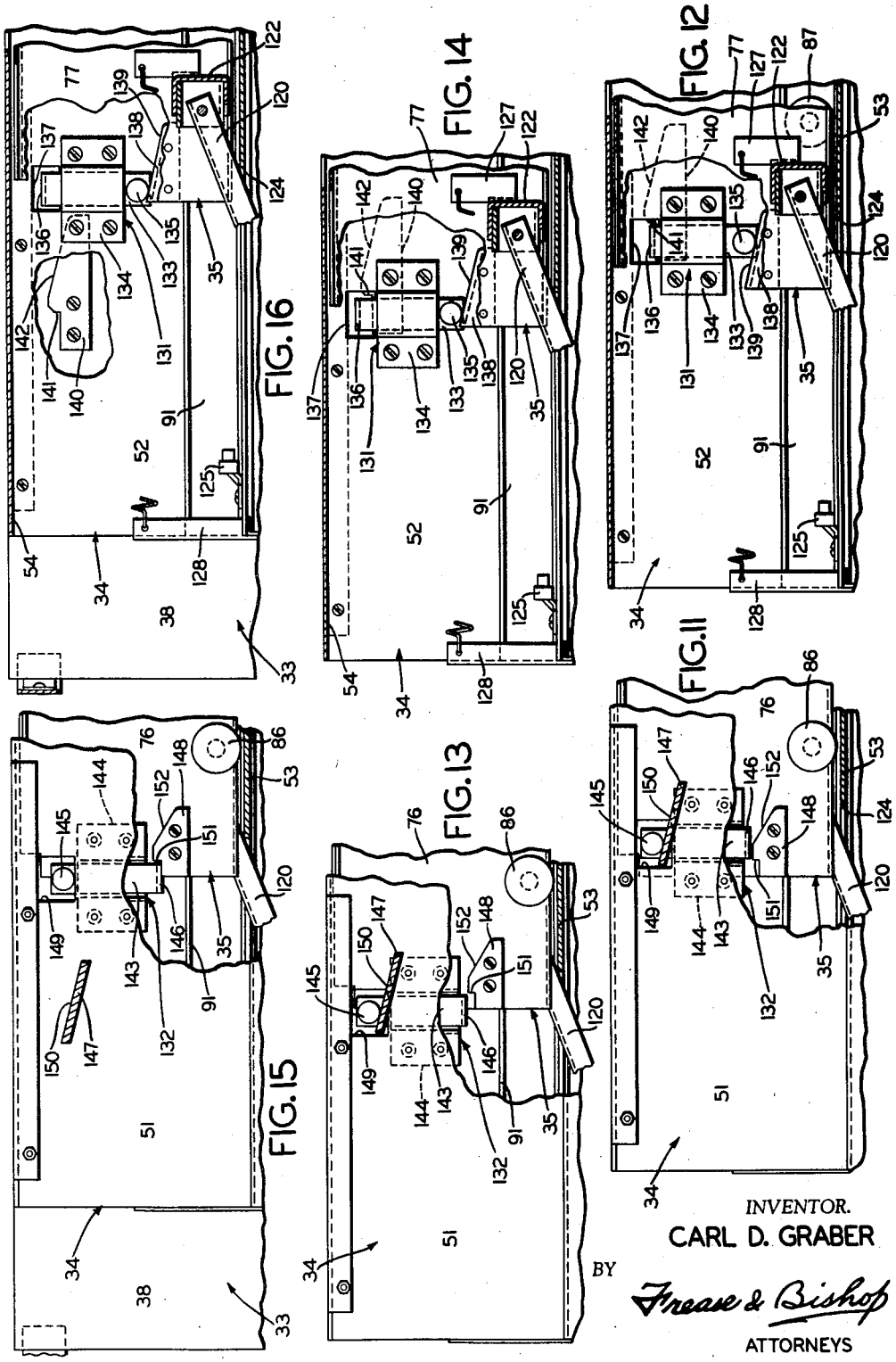

Aug. 23, 1960     C. D. GRABER     2,949,870
DEAL DRAWER CONSTRUCTION FOR BANK DRIVE-UP WINDOWS
Filed July 17, 1957     7 Sheets-Sheet 7

INVENTOR.
CARL D. GRABER
BY Frease & Bishop
ATTORNEYS

United States Patent Office 2,949,870
Patented Aug. 23, 1960

2,949,870

DEAL DRAWER CONSTRUCTION FOR BANK DRIVE-UP WINDOWS

Carl D. Graber, Orrville, Ohio, assignor to Diebold, Incorporated, Canton, Ohio, a corporation of Ohio Filed July 17, 1957, Ser. No. 672,440

15 Claims. (Cl. 109—19)

My invention relates to improvements in bank drive-up window construction and more specifically to an improved deal drawer construction for bank drive-up windows. Even more specifically my invention relates to an improved deal drawer construction for bank drive-up windows which may be adapted for hand or automatic operation.

Certain prior constructions of bank drive-up windows have included deal drawers which may be moved from a position in which they are accessible from the teller's side of the window but not accessible from the customer's side of the window to an extended position in which these deal drawers are accessible by the customer outwardly of the window. Most of these prior deal drawer constructions have merely included a conventional movable drawer having some form of receptacle means therein intermediate the length of the deal drawer into which papers and money may be placed for transfer from the teller's side of the window to the customer's side thereof or vice versa as the drawer is extended and retracted.

The principal difficulty with these prior constructions is that in order to make the receptacle in the deal drawer conveniently accessible to the teller, it has usually been necessary to have this receptacle positioned spaced rearwardly from the front or window end of the drawer so that when the deal drawer is extended forwardly to the customer's side of the window, the customer must be positioned in extremely close proximity to the window in order to be able to reach the papers or money in this receptacle. This requirement, of course, presents considerable difficulties in the case of a drive-up window construction in which it is intended for the customer to transact his banking business while seated in an automobile, since it is necessary for the automobile to be positioned extremely close to the front surface of the window construction.

Certain attempts have been made to overcome these difficulties by providing a deal drawer construction in which a movable receptacle or deal tray is provided, which deal tray is movable forwardly and rearwardly in the deal drawer while the drawer is still movable forwardly and rearwardly between the teller and customer sides of the window. This prior construction has been arranged so that when the deal drawer is fully retracted and only accessible from the teller's side of the window, the deal tray is positioned spaced rearwardly in the deal drawer and conveniently accessible by the teller.

Further, this prior construction has been arranged so that as the deal drawer is extended outwardly to the customer's side of the window, the deal tray at the same time moves progressively toward the front end of the drawer, that is to say, not only is the deal drawer movable outwardly toward its extended position, but also at the same time the deal tray is movable progressively forwardly within the deal drawer and with respect to the deal drawer. The relative movement between the drawer and tray is such that when the deal drawer reaches its completely or fully extended position, the deal tray has moved to the forwardmost end of the drawer, but the tray does not reach this forwardmost end until the drawer is completely extended. Thus, this prior construction does provide a receptacle which is more conveniently positioned with respect to the customer if the drawer is fully extended.

Although this construction has been an improvement over the first prior constructions discussed above, it still presents a major difficulty in that, unless the customer's automobile is perfectly positioned with respect to the drive-up window, it may not be possible to fully extend the deal drawer, in which case the deal tray will not have reached the forwardmost end of the deal drawer. This not only requires that the customer reach over a portion of the length of the deal drawer in order to reach the deal tray, but also presents the possibility that papers and money may accidentally be placed between the forward end of the deal tray and the forward end of the deal drawer, thereby being lodged within the confines of the deal drawer and inaccessible to the teller when the drawer is retracted to the teller's side of the window.

Thus, there is presented the unsatisfied want and need for a deal drawer construction which not only incorporates the increased extension of the receptacle or deal tray to provide greater convenience and accessibility to the customer, but also such a construction in which the full increased extension is always insured despite the extended position of the drawer. This would insure that the tray is always conveniently accessible by the customer when the drawer is extended, whether completely or otherwise, and also it would be substantially impossible for money and papers to be accidentally placed between the deal tray and drawer, making such money and papers inaccessible to the teller when the drawer is retracted.

Certain of the prior constructions of deal drawers discussed above have been arranged for hand operation, whereas others have been arranged for automatic operation, that is, driven by some form of motor means. Usually, when it is desired to alter any particular construction of deal drawer from hand operation to automatic operation in original manufacture, it is necessary to completely reconstruct the deal drawer construction as well as the operating mechanism therefor, thereby requiring a manufacturer to produce two distinct and completely separate models, one for hand operation and one for automatic operation.

Furthermore, when these prior deal drawer constructions have been adapted for automatic operation, it has heretofore been necessary to use complicated mechanisms including numerous limit switches, timers, lever arms and expensive mechanical expedients in order to accomplish the proper movement of the deal drawer and also eliminate therefrom any danger to the customer or his automobile occasioned by the drawer striking the customer or his automobile during its movement. Thus, there is also presented a long-standing unsatisfied want and need for a bank drive-up window construction which includes a deal drawer that may be adapted for hand operation but yet with only minor changes and a minimum of increased expense and may be simply adapted for foolproof automatic operation.

It is therefore a general object of the present invention to provide a deal drawer construction for bank drive-up windows which eliminates the above-described difficulties and disadvantages of the prior constructions.

It is a primary object of the present invention to provide a deal drawer construction for bank drive-up windows which includes a movable deal tray which is movable with respect to the deal drawer or movable frame, thereby providing the advantage of greater accessibility to the customer as hereinbefore described.

It is a further object of the present invention to provide a deal drawer construction for bank drive-up windows in which the deal tray is first moved by the teller to the front of the deal drawer while the deal drawer remains stationary in fully retracted position and, upon the deal tray reaching its forwardmost position in the deal drawer, the deal drawer is then moved outwardly to the customer's side of the window for access by the customer.

It is still a further object of the present invention to provide a deal drawer construction for bank drive-up windows which is formed so that a minimum amount of force is required by the teller to move the deal drawer from its fully extended position projecting outwardly at the customer's side of the window to its fully retracted position at the teller's side of the window and inaccessible by the customer.

Additionally, it is an object of the present invention to provide a deal drawer construction for bank drive-up windows in which the deal drawer is positively locked in fully retracted position inaccessible by the customer until the deal tray has been moved to its forwardmost position at the front end of the deal drawer, at which time the deal drawer is automatically unlocked so that the deal drawer and tray may be extended to the customer's side of the window.

Also, it is an object of the present invention to provide a deal tray construction for bank drive-up windows in which the movement of the deal tray and deal drawer in their proper sequence is accomplished in a unique manner providing the maximum of simplicity for the construction.

It is still an additional object of the present invention to provide a deal tray construction for bank drive-up windows in which the deal drawer and tray are completely closed at the teller's side of the window except for an opening formed in the counter through which the teller has access to the confines of the deal tray when the drawer and tray are in retracted position, and which construction maintains the opening in the counter substantially closed at all times when the deal tray does not underlie this opening, thereby preventing papers and money from accidentally falling into the deal drawer or stationary frame upon which the deal drawer is mounted and also preventing the passage of air through the deal drawer into the teller's side of the window when the deal drawer is extended.

It is still another object of the present invention to provide a deal drawer construction for bank drive-up windows which can be changed from hand to automatic operation with a minimum of alteration and without requiring the addition of complicated and expensive mechanism as has been heretofore required in such constructions.

Finally, it is an object of the present invention to provide a deal drawer construction for bank drive-up windows which is relatively simple in operation, is simple in construction and can be manufactured at a minimum of expense.

These and other objects are accomplished by the parts, constructions, arrangements, combinations and sub-combinations comprising the present invention, the nature of which is set forth in the following general statement, preferred embodiments of which—illustrative of the best modes in which applicant has contemplated applying the principles—are set forth in the following description and illustrated in the accompanying drawings, and which are particularly and distinctly pointed out and set forth in the appended claims forming a part hereof.

In general terms, the improved deal drawer construction comprising the present invention is for use in bank drive-up windows of the general type having a front, generally vertically extending wall enclosing the window glass and through which the deal drawer extends, and a generally horizontally extending teller's counter having an opening formed therein spaced rearwardly from the front wall and beneath which counter the deal drawer is supported. The deal drawer construction includes a stationary frame mounted beneath the counter and having a movable frame mounted therein which underlies the counter opening, which movable frame is mounted for movement outwardly through the front wall to an extended position accessible by the customer and inwardly to a fully retracted position in which only a front end member of the movable frame is exposed at the outer side of the wall.

More specifically, the movable frame is preferably mounted by roller means in the stationary frame so that, as the movable frame is extended from the stationary frame and outwardly to the customer's side of the front wall, the generally horizontal plane of movement of the movable frame is angled slightly upwardly from an exactly horizontal plane. With this arrangement, components of the weight of the movable frame are directed rearwardly toward the stationary frame when the movable frame is extended, thereby aiding the force applied for retracting the movable frame and in this manner requiring less force to be exerted for such retraction.

Generally, according to the principles of the present invention, a deal tray is mounted in the movable frame for movement forwardly and rearwardly in said frame. Preferably, the deal tray is mounted movable from a position directly underlying the counter opening and intermediate the length of the movable frame to a position at the extreme forward end of the movable frame, with the movable frame remaining stationary and fully retracted. Further, in this forward position, the deal tray is not accessible through the counter opening.

Still further, the construction of the present invention generally includes operating means for first moving the deal tray from a position underlying the counter opening to its position at the forward end of the movable frame while the movable frame remains in fully retracted position, unaccessible from the outer or customer's side of the window, and then for moving the movable frame outwardly through the front wall of the window construction to an extended position in which the deal tray is accessible by the customer. This operating means preferably includes a chain sprocket means for driving the deal tray forwardly and rearwardly and for driving the movable frame by force directed through the deal tray between the extended and retracted positions of the movable frame.

Also, preferably a first latch means is positioned engageable between the stationary and movable frames for locking the movable frame in fully retracted position unless the deal tray is in its forwardmost position at the front portion of the movable frame and inaccessible from the counter opening. There is in addition a second latch means between the deal tray and movable frame cooperating with the first latch means and locking the deal tray and movable frame together during extension and retraction of the movable frame and when the deal tray is in its forwardmost position at the forward end of the movable frame, with this second latch means engaging when the first latch means disengages and with this second latch means disengaging when the first latch means engages.

Finally, the chain sprocket operating means is preferably arranged with either manually operated handle means for moving the deal tray and consequently the movable frame or automatic motor drive means for providing the same operation. The handle means preferably comprises a handle extending above the counter and movable forwardly and rearwardly toward and away from the front wall of the construction, while the motor drive means preferably comprises an electric motor with suitable limit and operating switches, as well as V-belt drive means providing slippage in the event an obstacle is encountered either by the deal tray or movable frame during movement thereof.

Figure 2:
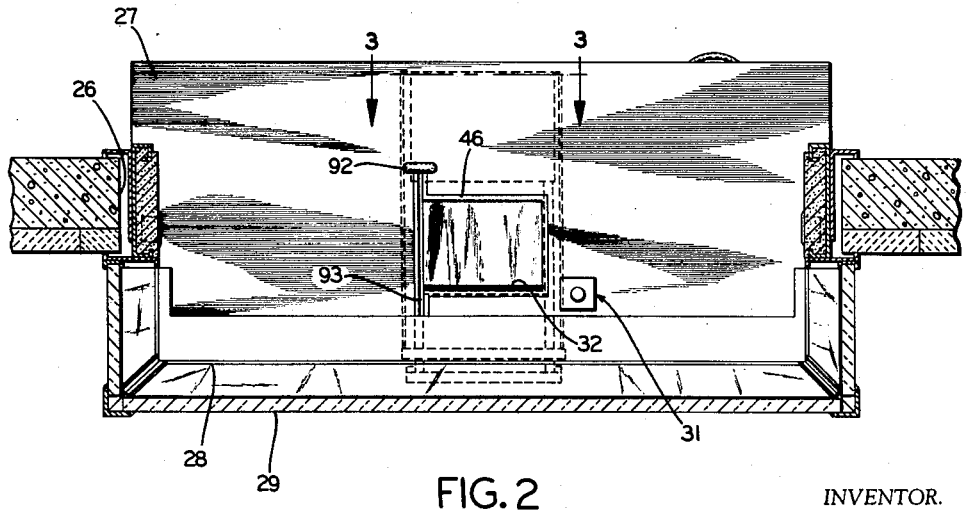
Figure 3:
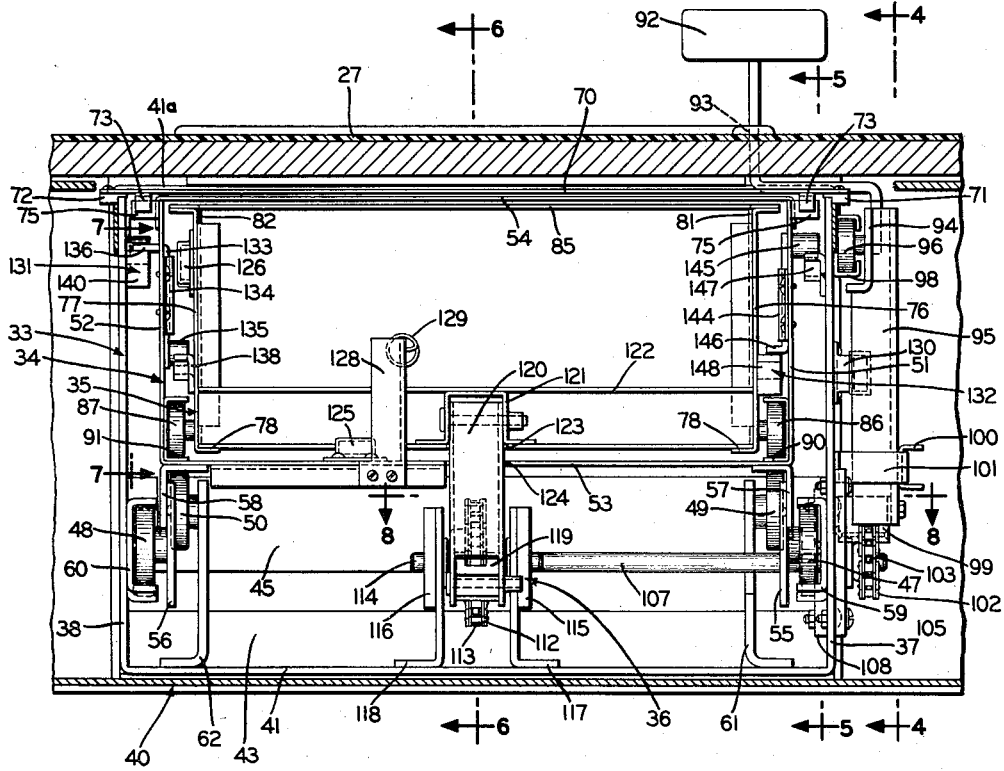
Figure 4:
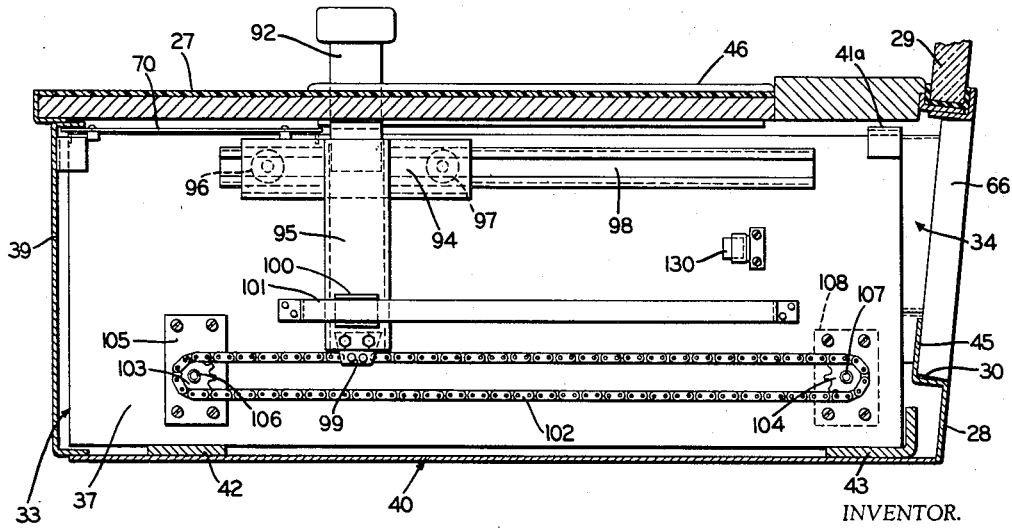
Figure 19:
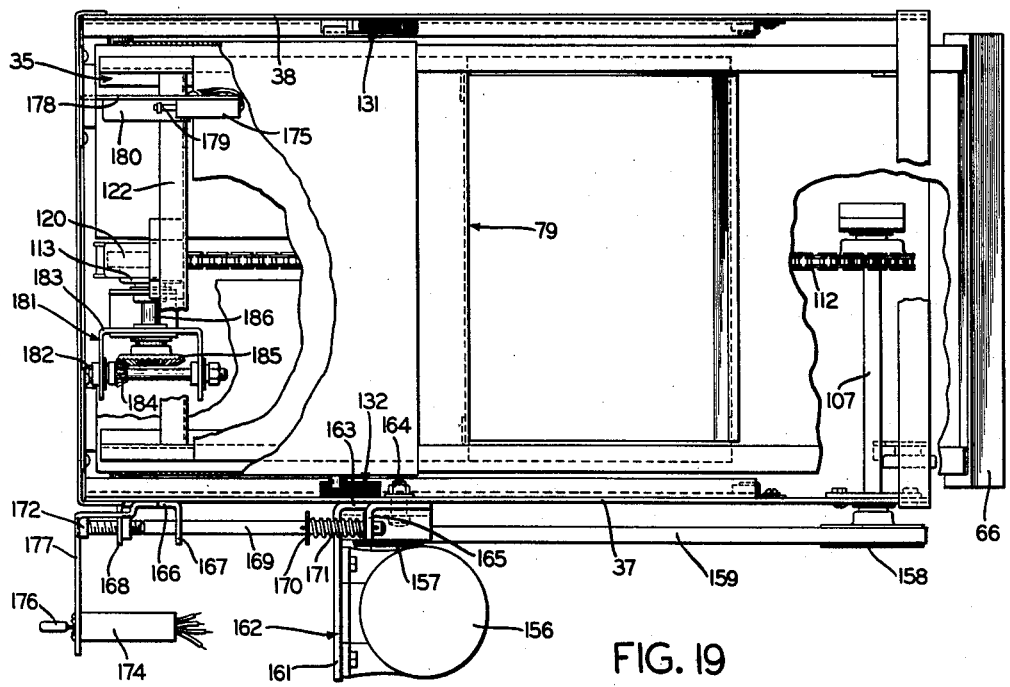
Figure 20:
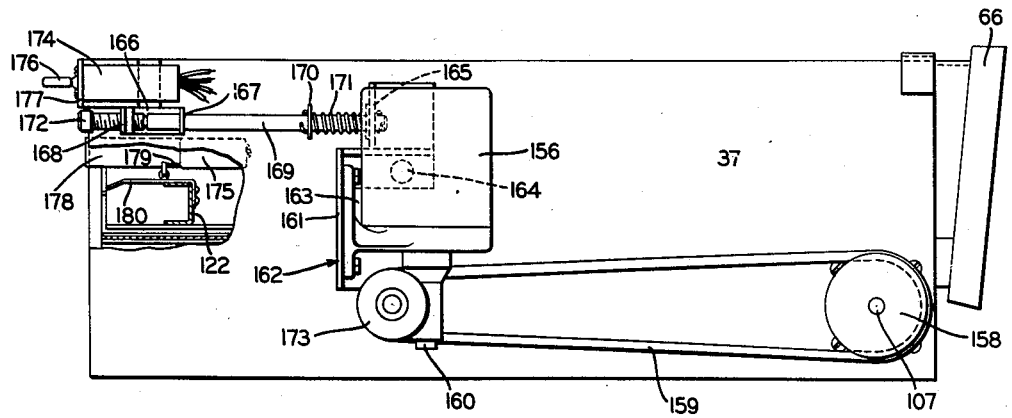
Figure 21:
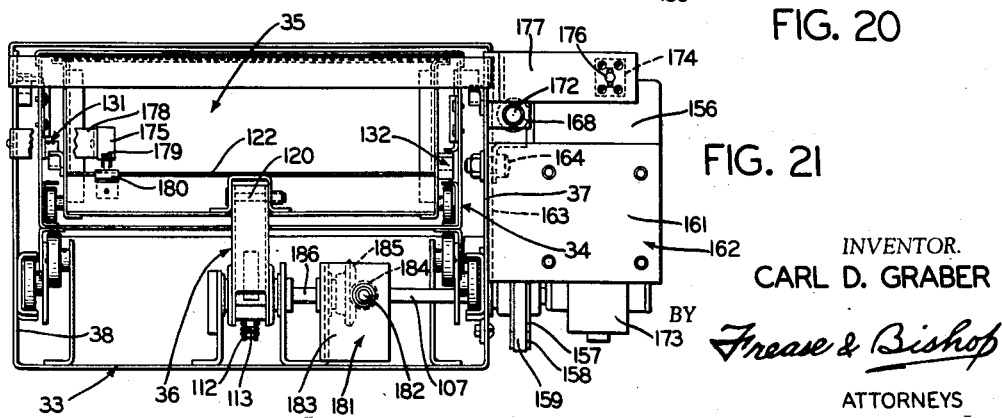

By way of example, embodiments of the deal drawer construction for bank drive-up windows comprising the present invention are illustrated in the accompanying drawings forming a part hereof, wherein like numerals indicate similar parts throughout the several views, and in which:

Fig. 1 is a front elevation of a bank drive-up window incorporating the deal drawer construction comprising the present invention;

Fig. 2, a sectional view, part in elevation, looking in the direction of the arrows 2—2 in Fig. 1 and showing a top plan view of the drive-up window counter having the deal drawer construction of the present invention mounted therebeneath;

Fig. 3, a sectional view, part in elevation, looking in the direction of the arrows 3—3 in Fig. 2;

Fig. 4, a sectional view, part in elevation, looking in the direction of the arrows 4—4 in Fig. 3 and showing the movable frame in fully retracted position and the deal tray in its rearward position underlying the counter opening;

Fig. 5, a sectional view, part in elevation, looking in the direction of the arrows 5—5 in Fig. 3 and showing the movable frame and deal tray in the same positions as in Fig. 4;

Fig. 6, a sectional view, part in elevation, looking in the direction of the arrows 6—6 in Fig. 3 and showing the movable frame and deal tray in the same positions as shown in Fig. 4;

Fig. 7, a fragmentary sectional view, part in elevation, looking in the direction of the arrows 7—7 in Fig. 3;

Fig. 8, a fragmentary sectional view, part in elevation, looking in the direction of the arrows 8—8 in Fig. 3;

Fig. 9, a sectional view, part in elevation and with parts thereof broken away, similar to Fig. 5 but with the deal tray in its forward position at the forward end of the movable frame but with the movable frame still in fully retracted position;

Fig. 10, a view similar to Fig. 9 but with the movable frame fully extended;

Fig. 11, a fragmentary sectional view, part in elevation and with parts thereof broken away, showing the latch construction engageable between the deal tray and movable housing in its disengaged position just prior to the deal tray reaching the forward end of its movement in the movable frame;

Fig. 12, a fragmentary sectional view, part in elevation and with parts thereof broken away, showing the latch engageable between the movable frame and stationary frame in its engaged position just prior to the deal tray reaching the forward end of its movement in the movable frame;

Fig. 13, a view similar to Fig. 11 with the latch still disengaged but with the deal tray having just reached the forward end of its movement in the movable frame;

Fig. 14, a view similar to Fig. 12 but with the latch disengaged and the deal tray just having reached the forward end of its movement in the movable frame;

Fig. 15, a view similar to Fig. 11 but with the latch engaged and the movable frame intermediate its movement to extended position;

Fig. 16, a view similar to Fig. 12 but with the latch completely disengaged and the movable frame intermediate its movement to fully extended position;

Fig. 17, a fragmentary sectional view, part in elevation, with the movable frame fully extended showing a second embodiment of closure means for maintaining the opening through the counter top closed during such extension;

Fig. 18, a view similar to Fig. 17 but with the movable frame in fully retracted position;

Fig. 19, a top plan view, partially broken away, of a third embodiment of the present invention showing the deal drawer construction adapted for automatic operation;

Fig. 20, a side elevation, partially broken away, showing the construction of Fig. 19; and Fig. 21, an end view, partially broken away, looking from the rearward end to the forward end of the construction of Fig. 19.

As shown in Figs. 1 and 2, the deal drawer construction comprising the present invention may be installed in and form a part of a conventional bay window type drive-up window construction, generally indicated at 25, which window construction is installed extending partially through an opening 26 in the wall of a structure in a conventional manner. As shown in Fig. 2, the window construction 25 includes a counter 27 which also extends through the wall opening 26 and extending partially inwardly and partially outwardly of said wall.

The counter 27 terminates preferably forwardly at the front wall 28 of the window construction, which front wall extends from below the glassed opening 29, with the counter 27 preferably being positioned at or below glassed opening 29. Further, the front wall 28 of the window construction is provided with the usual opening 30 in the front wall 28 through which a portion of the deal drawer construction may be extended, as will be hereinafter described, and the window construction is provided with the usual communication system, generally indicated at 31.

As shown in Fig. 2, the counter 27 is provided with an opening 32 formed therethrough and beneath which is mounted the deal drawer construction comprising the present invention, partially shown by dotted lines in Fig. 2. As best seen in Figs. 3 through 8, the deal drawer construction comprising the present invention includes a stationary frame, generally indicated at 33, a movable frame, generally indicated at 34, a deal tray, generally indicated at 35, and operating means, generally indicated at 36.

In order to provide clarity and avoid misunderstanding, it should be understood that in the present specification and claims, where applicable, directions are taken from the position of the teller within the drive-up window construction. For instance, the inner side of the front wall 28 of the construction would be the teller's side and would be to the upper portion of Fig. 2, whereas the outer side of front wall 28 would be the customer's side and toward the lower portion of Fig. 2.

Furthermore, forward or forwardly would be toward the customer and rear or rearwardly would be toward the teller. Finally, as indicated by the arrows 3—3 in Fig. 2, Fig. 3 is a sectional view looking in the direction that the teller would look toward the customer, so that the right-hand side of the deal drawer construction would be shown at the right-hand side in Fig. 3 and the left-hand side of the deal drawer construction would be shown at the left-hand side in Fig. 3.

As shown in Figs. 3 through 8, the stationary frame 33 is generally box-like in configuration and includes the upstanding side walls 37 and 38 and rear wall 39, all of which are suitably supported in the main frame of the window construction, generally indicated at 40. As best seen in Fig. 6, the deal drawer construction further includes a bottom wall 41 which is preferably spaced upwardly from the main frame 40 by means of suitable spacer members 42 and 43, and a narrow tie member 41a, shown in cross-section in Fig. 6, for aiding in supporting the side walls 37 and 38.

Still further, as shown in Fig. 6, the main frame 40 extends forwardly and is attached to the front wall 28, with wall 28 being provided with the inwardly directed flange 44 forming the opening 30 and the upwardly directed flange 45 for a purpose to be hereinafter described. Also, as shown, the counter 27 is suitably supported on the main frame 40, is provided with a metal molding member 46 around the opening 32, and is formed with a raised section at the forward portion thereof adjacent and joining the front wall 28 and glassed opening 29.

The movable frame 34 is supported in the stationary frame 33 for forward and rearward movement through the opening 30 of the front wall 28 by means of a rearward set of movable rollers 47 and 48 and a forward set of stationary rollers 49 and 50. Movable frame 34 includes the upstanding side walls 51 and 52, the bottom wall 53 and a partial top wall 54 extending from the rearward end of stationary frame 34 forwardly to a point spaced rearwardly from the counter opening 32, when the movable frame is in its retracted position as shown in Fig. 6.

The movable rollers 47 and 48 are supported spaced downwardly from the bottom wall 53 by suitable supporting members 55 and 56, respectively, which supporting members are in turn attached to the inverted L-shaped track members 57 and 58, respectively. Track members 57 and 58 form the two-fold purpose of supporting the movable rollers 47 and 48 on the bottom wall 53 and also of forming a track by which the bottom wall 53 is supported on and may move forwardly and rearwardly of the stationary rollers 49 and 50.

The movable rollers 47 and 48 run in the generally U-shaped tracks 59 and 60, which tracks extend generally horizontally along and are attached to the side walls 37 and 38, respectively, of the stationary frame 33. Tracks 59 and 60 extend from the rearward end of the stationary frame 33 to a point spaced rearwardly from the forward end thereof. Further, it is preferred that these tracks are positioned on the side walls 37 and 38 of the stationary frame so that the tracks angle slightly downwardly from an exact horizontal plane from their rearward to their forward ends, as is shown in Figs. 3, 5 and 6, for a purpose to be hereinafter described.

The stationary rollers 49 and 50 are supported at the forward end of the stationary frame 33 spaced slightly rearwardly from the forward end of the movable frame 34 by means of generally L-shaped supporting members 61 and 62 which are supported on the bottom wall 41 of the stationary frame 33. As before stated, stationary rollers 49 and 50 receive the L-shaped track members 57 and 58 thereover, as shown in Fig. 3, and thereby, in cooperation with the movable rollers 47 and 48, support the movable frame 34 for forward and rearward movement through the opening 30 in the front wall 28.

A generally vertically extending front end member 63 is mounted on the movable frame 34 connected to the bottom wall 53 and side walls 51 and 52, as best seen in Fig. 6. The front end wall of stationary frame 33 is further preferably provided with a second thickness of preferably armor plate 64 secured to the front face of front member 63 and extending outwardly from all sides of end member 63, such plate being supported at the bottom edge thereof by a generally L-shaped supporting member 65 secured to plate 64 and the bottom wall 53 of the movable frame.

A generally L-shaped cross section resilient bumper and sealing member 66 is positioned surrounding the outer edge of plate 64, with one leg 67 of this L-shaped member projecting along the front surface of plate 64, and with the other leg 68 thereof extending rearwardly covering the edge of plate 64 and to a generally vertical plane spaced rearwardly from plate 64 and front end member 63. As shown in Fig. 6, this bumper and sealing member 66 serves to seal the front opening 30 in the front wall 28 when the movable frame 34 is in its fully retracted position, with this member 66 also serving as a front end bumper for the movable frame as the movable frame is extended. Still further, member 66 serves as a bumper when the movable frame is retracted by abutting the front surface of the upwardly directed flange 45, again as seen in Fig. 6.

To further cushion the inward movement of the movable frame 34, one or more bumper members 69 may be secured to the inner side of the stationary frame rear wall 39. These bumper members 69, of course, are provided with a suitable resilient material for abutting the rearward end of the movable frame 34.

A slidable cover plate 70 is mounted spaced above the top wall 54 of the stationary frame 33, with the side edges of cover plate 70 extending over the top edges of the stationary frame side walls 37 and 38, as best seen in Fig. 3. Further, the side edges of this cover plate 70 are provided with downwardly extending flange portions 71 and 72 which abut and are slidable along the outer side surfaces of the stationary frame side walls 37 and 38 for guiding cover plate 70 in forward and rearward movement along walls 37 and 38.

As shown in Fig. 6, the cover plate 70 extends forwardly from the stationary frame rear wall 39 to a point spaced rearwardly from the forward edge of the movable frame top wall 54 when the movable frame 34 is in its fully retracted position as shown in Fig. 6. Further, cover plate 70 is provided with a pair of generally vertically downwardly extending tabs 73 spaced from the rearward edge of plate 70 and a second pair of generally vertically downwardly extending tabs 74 spaced rearwardly from the forward edge of plate 70, with one tab of each set extending downwardly between the stationary frame side wall 37 and movable frame side wall 51 and the other tab of each set extending downwardly between the stationary frame side wall 38 and the movable frame side wall 52.

Also, a pair of tabs 75 is mounted extending laterally outwardly from each of the movable frame side walls 51 and 52, with tabs 75 being positioned in forward and rearward alignment with the cover plate sets of tabs 73 and 74 and therefore in position to engage the tabs 73 and 74. As best seen in Fig. 6, the cover plate tabs 73 are positioned at all times rearwardly of the movable frame tabs 75 and the cover plate tabs 74 are positioned at all times forwardly of the movable frame tabs 75 so that, as the movable frame 34 moves forwardly, the tabs 75 thereof may eventually engage the cover plate tabs 74 to thereby slide the cover plate 70 along the stationary frame 33. Further, when the cover plate 70 has been moved forwardly, rearward movement of the movable frame 34 will eventually cause engagement between the movable frame tab 75 and the cover plate tab 73 to thereby slide the cover plate 70 rearwardly along the stationary frame 33, such sequence of movement being hereinafter more fully explained.

The deal tray 35 is also generally box-like in configuration having the side walls 76 and 77 extending inwardly at the bottom edges thereof to form the bottom flanges 78, with these walls 76 and 77 extending substantially from the rearward end of stationary frame 33 to a point generally underlying the forward edge of the counter opening 32, as shown in Fig. 6. A tray or receptacle portion 79 is mounted underlying and in vertical alignment with the counter opening 32 when the deal tray 35 is in its fully retracted position within the movable frame 34, as shown in Fig. 6.

The tray portion 79 is preferably a completely separate unit in itself, being secured within the deal tray 35, with the receptacle bottom wall 80 abutting the deal tray bottom flanges 78, the side walls 81 and 82 abutting the deal tray side walls 76 and 77, and with the front wall 83 and rear wall 84 suitably supported between the deal tray side walls 76 and 77. Preferably each of the deal tray side walls 76 and 77 is flanged outwardly at its upper end as are the tray portion side, front and rear walls 81, 82, 83 and 84, with the tray portion walls overlapping the deal tray walls and being secured thereto.

The rear wall 84 of tray portion 79 extends rearwardly along the top edges of the deal tray side walls 76 and 77 to a point spaced forwardly from the rearward edges of the deal tray walls 76 and 77 forming a rearwardly extending cover portion 85. As will be hereinafter more clearly pointed out in the proper sequence of operation, this cover portion 85 cooperates with the movable frame top wall 54 and the slidable cover plate 70 to close the counter opening 32 when the deal tray 35 is extended forwardly so that the tray portion 79 thereof no longer underlies this opening 32, and during the forward extension of the movable frame 34 through the opening 30 of the front wall 28. Further, this portion, wall and plate maintain counter opening 32 closed until the units are fully retracted and the tray portion 79 once again underlies the counter opening 32.

The deal tray 35 is mounted for slidable movement forwardly and rearwardly within the movable frame 34 by means of the rear set of rollers 86 and 87 and the forward set of rollers 88 and 89, with rollers 86 and 88 being rotatably secured to the deal tray side wall 76 near the lower edge thereof and projecting laterally therefrom, and with rollers 87 and 88 being similarly attached to the deal tray side wall 77. As best seen in Fig. 3, the movable frame side wall 51 is provided with a generally U-shaped track 90 along the lower edge thereof and resting on the movable frame bottom wall 53, with this track extending substantially the entire forward and rearward length of the movable frame 34, opening toward the deal tray side wall 76 and receiving the deal tray rollers 86 and 88.

Further, the movable frame side wall 52 is provided at the inner side thereof with a similar generally U-shaped track 91 which is positioned extending parallel to track 90 also extending substantially the entire forward and rearward length of the movable frame 34, with track 91 opening toward the deal tray side wall 77 and receiving the deal tray rollers 87 and 89. Thus, the deal tray 35 is mounted for forward and rearward slidable movement within the movable frame 35 by means of the rollers 86, 87, 88 and 89 rolling within the tracks 90 and 91.

The operating means, generally indicated at 36, for providing forward and rearward motion to both the deal tray 35 and movable frame 34 within the stationary frame 33 is shown in this first embodiment adapted for hand operation. As shown in Fig. 2, an operating handle 92 is mounted for forward and rearward movement extending from above the counter 27 downwardly through a forwardly and rearwardly extending slot 93 formed in counter 27 at the teller's right-hand side of the counter opening 32.

As best seen in Figs. 3, 4, 5 and 8, operating handle 92 preferably extends downwardly through slot 93 to a point just below counter 27 and then extends laterally over the movable frame side wall 51 and stationary frame side wall 37 to a point spaced laterally from the outer side of stationary frame side wall 37. At this point handle 92 extends downwardly and, as shown in Figs. 4 and 8, is secured to a generally horizontally extending L-shaped guide roller bracket 94 and a generally vertically extending U-shaped chain connecting bracket 95.

As shown in Fig. 4, the guide roller bracket 94 projects forwardly and rearwardly at either side of the chain connecting bracket 95 spaced a short distance from the upper edge of the stationary frame side wall 37, with this bracket 94 being connected substantially at its midpoint to the handle 92. Mounted on the guide roller bracket 94 and extending toward the stationary frame side wall 37 is a pair of spaced handle guide rollers 96 and 97, with roller 96 being spaced rearwardly from chain connecting bracket 95 and with roller 97 being spaced forwardly thereof.

Handle guide rollers 96 and 97, as shown in Figs. 3 and 4, are received in a generally U-shaped guide track 98 secured to the outer surface of the stationary frame side wall 37 and extending parallel to the guide roller bracket 94. Further, the edges of guide track 98 toward the guide roller bracket 94 and over the entire length of track 98 are preferably flanged downwardly and upwardly, as shown in Fig. 3, for enclosing the outer extremities of the handle guide rollers 96 and 97. Thus, guide track 98 not only guides the handle 92 for forward and rearward movement in the slot 93, but also prevents lateral movement thereof.

The chain connecting bracket 95 extends downwardly from handle 92 and the guide roller bracket 94 to a point spaced from the lower edge of the stationary frame side wall 37 where bracket 95 is suitably connected to a chain connecting block 99. Spaced above the lower end of bracket 95 a generally U-shaped guide member 100 is secured to the outer side of this bracket, opening away from the stationary frame side wall 37 and engaging a forwardly and rearwardly extending guide bar 101, which guide bar is secured to the stationary frame side wall 37 and extends outwardly around the chain connecting bracket 95, as shown in Figs. 3 and 4.

Thus, the lower end of the chain connecting bracket 95 is further guided for forward and rearward movement by the guide member 100 and guide bar 101. Also, with the combination of the guide rollers 96 and 97, with the guide track 98 and this guide member 100 on the guide bar 101, the handle 92 and chain connecting bracket 95 are provided with maximum stability in their forward and rearward movement.

The chain connecting block 99 is secured to the upper strand of an operating chain 102, which chain is operatively engaged over the rotatable sprocket members 103 and 104. Sprocket member 103 is mounted spaced forwardly of the rearward edge of the stationary frame side wall 37 and spaced above the lower edge of said side wall by means of a bearing member 105 secured to side wall 37 and having the stub shaft 106.

Sprocket member 104 is similarly mounted in the side wall 37 spaced from the forward edge thereof in substantially horizontal alignment with sprocket 103, as shown in Fig. 4. As best seen in Fig. 8, however, the sprocket member 104 is mounted on the outer end of a shaft 107, which shaft extends through the stationary frame side wall 37, being rotatably mounted in a bearing member 108 secured to the inner side of the side wall 37.

Further, shaft 107 extends inwardly into the confines of the stationary frame 33 to a point substantially midway of this stationary frame, where the inner end thereof extends through and mounts a sprocket member 109 and is in turn mounted in a bearing member 110. The bearing member 110 is mounted spaced above the stationary frame bottom wall 41 by means of an L-shaped mounting bracket 111, as shown.

As best seen in Figs. 5, 6 and 8, a second operating chain 112 is engaged over the sprocket member 109 and extends rearwardly where it is engaged over a sprocket member 113 spaced forwardly from the rearward end of the stationary frame 33. As best seen in Fig. 3, sprocket member 113 is mounted on a shaft 114, which shaft in turn extends through a pair of spaced bearing members 115 and 116, with these bearing members being supported above the stationary frame bottom wall 41 by means of a pair of generally L-shaped mounting brackets 117 and 118.

As shown in Figs. 3, 6 and 8, a chain connecting block 119 is secured to chain 112 and pivotally mounts the lower end of a connecting link 120. The upper end of connecting link 120 is pivotally mounted in a generally U-shaped bracket 121, as shown in Fig. 3, with bracket 121 being secured in a laterally extending channel member 122.

Channel member 122 is secured between the deal tray side walls 76 and 77 resting on the deal tray bottom flanges 78 and opening rearwardly, as shown in cross section in Fig. 6. A portion of the lower leg of channel member 122 is slotted as at 123 and the movable frame bottom wall 53 is also slotted as shown at 124 to accommodate the upper end of connecting link 120.

Thus, with the operating means 36 thus far described, with the deal tray 35 in the position shown in Fig. 6, when the handle 92 is moved forwardly in the counter slot 93, this handle, through the chain connecting bracket 95 and chain connecting block 99, moves the chain 102, thereby rotating the sprockets 103 and 104. Further, since sprocket 104 is connected to the shaft 107, which shaft is also connected to the sprocket 109, when sprocket 104 is rotated it rotates shaft 107 and thus sprocket 109, rotating the inner chain 112.

As chain 112 rotates around sprockets 109 and 113, it moves the chain connnecting block 119 upwardly around sprocket 113 and forwardly. Due to the pivotal connection between block 119 and the connecting link 120, the connecting link 120 is also moved forwardly, thereby pivoting around the bracket 121 on channel member 122 and moving channel member 122 and consequently the deal tray 35 forwardly.

Still further, as the deal tray 35 is moved forwardly through this chain arrangement by the handle 92, the tray portion 79 thereof will ultimately reach a position in which the tray portion front wall 83 abuts and engages the movable frame front wall 63 so that, as will be hereinafter more fully described, the deal tray 35 is arranged to transmit this forward motion to the movable frame 35, and for simplicity and economy of construction, it is preferred to provide this forward motion solely to the deal tray 35, as described, and depend on the unique relationship between the deal tray 35 and the movable frame 34 to transmit the motion to the movable frame 34. Also, as shown, it is preferred to form the sprocket members 103 and 104 of a smaller diameter with a smaller number of teeth than the sprocket members 109 and 113 so that a definite mechanical advantage in movement is gained, that is, for a given movement of the handle 92 forwardly and rearwardly in the counter slot 93, the deal tray 35 and ultimately the movable frame 34 will be moved forwardly or rearwardly a greater distance, dependent on the particular ratio between the sizes of the sprockets 103 and 104 and the sizes of the sprockets 109 and 113.

As best seen in Fig. 6, a resilient bumper assembly is preferably provided between the deal tray 35 and movable frame 34 for limiting the rearward movement of deal tray 35 within movable frame 34, and also for cushioning the stopping of deal tray 35 when it reaches this rearward limit of movement. This resilient bumper assembly is indicated at 125 and is mounted on the movable frame bottom wall 53 abutting the lower leg of the channel member 122 when the deal tray 35 is in its rearmost position with the tray portion 79 thereof underlying the counter opening 32.

Further, a second bumper assembly, indicated at 126, is mounted on the outer side of the deal tray side wall 77 positioned with a portion thereof extending forwardly of the deal tray front wall 83, as shown. This forwardly extending portion of bumper assembly 126 is formed of resilient material for engaging the movable frame front wall 63 when the deal tray 35 is moved to its forwardmost position within the movable frame 34, as hereinbefore briefly described.

Still further, a spring connecting member 127 is preferably mounted on and extends upwardly from the channel member 122, and a spring connecting member 128 is preferably mounted on and extends upwardly from the rearward edge of the movable frame bottom wall 53, with a tension spring 129 being connected between these two connecting members. This tension spring 129 is tensioned as the deal tray 35 moves forwardly in the movable frame 34 so that, upon the rearward movement of the deal tray 35, the spring 129 will exert a force insuring that the deal tray 35 is returned to its full rearward position, with the tray portion 79 thereof underlying the counter opening 32.

Also, as shown in Fig. 4, it is preferred to provide a resilient bumper assembly 130 mounted on the outer surface of the stationary frame side wall 37 in alignment with and at the forward limit of travel of the handle chain connecting bracket 95, providing a forward cushion stop for the handle 92. Thus, as will be hereinafter more fully described, when the deal tray 35 is moved to its forwardmost position and the movable frame 34 is thereafter moved to its fully extended position, extending through the opening 30 of the front wall 28, this forward motion will be provided with a cushioned stop by the bumper assembly 130.

As shown in Figs. 3, 5 and 6, according to the principles of the present invention, the construction includes a stationary frame-movable frame latch assembly, generally indicated at 131 in Figs. 3 and 6, and a movable frame-deal tray latch assembly, generally indicated at 132 in Figs. 3 and 5. Starting from fully retracted position, that is, the position of the movable frame 34 and deal tray 35 as shown in Fig. 6, the purpose of the stationary frame-movable frame latch assembly 131 is to lock the movable frame 34 to the stationary frame 33 while the deal tray 35 is moving forwardly and until the deal tray reaches its forwardmost position abutting the front end member 63 of the movable frame 34, at which time latch assembly 131 disengages and the movable frame-deal tray latch assembly 132 engages for locking the deal tray 35 and movable frame 34 together during the outward and inward movement of the movable frame 34 through the opening 30 of front wall 28.

Further, as the movable frame 34 again reaches its fully retracted position, the movable frame-deal tray latch assembly 132 disengages and the stationary frame-movable frame latch assembly 131 reengages, thereby again locking the movable frame 34 to the stationary frame 33 and permitting the deal tray 35 to be moved rearwardly to its retracted position as shown in Fig. 6. Both of the latch assemblies 131 and 132 are of similar construction and are automatically actuated for locking or unlocking at the proper time during the sequence of movement of the movable frame 34 and deal tray 35.

Looking in the direction as shown in Fig. 3, the stationary frame-movable frame latch assembly 131 includes a generally Z-shaped latch member 133 mounted on the inner surface of the movable frame side wall 52 for limited vertical movement by the generally U-shaped latch guide 134. Latch member 133 is provided at its lower end with a laterally extending cam roller 135 projecting toward the deal tray side wall 77 and at its upper end with a laterally extending latching bar 136 extending through a slotted opening 137 formed in the movable frame side wall 52 and extending toward the stationary frame side wall 38.

A cam member 138 is mounted on the outer surface of the deal tray side wall 77 in proper alignment with and positioned for engagement by the latch member cam roller 135 as the deal tray 35 approaches its forwardmost position within the movable frame 34. Cam member 138 is provided with a forwardly downwardly angled cam surface 139 for engagement by cam roller 135 and so that cam roller 135 may roll up the cam surface 139 during the forward movement of deal tray 35 to move the latch member 133 and thus the latching bar 136 upwardly.

A latching block 140 is mounted on the inner surface of the stationary frame side wall 38 in proper alignment with the latching bar 136 for retaining the movable frame 34 locked against forward movement with reference to the stationary frame 33. This latching block 140 is provided with a hook-like engaging surface 141 and a forwardly downwardly angled cam surface 142 positioned forwardly of surface 141, as shown in Fig. 6.

The movable frame-deal tray latch assembly 132 similarly includes a latch member 143, a latch guide 144, a cam roller 145, a latching bar 146, a cam member 147 and a latching block 148. The latch member 143 is similarly mounted vertically slidable on the inner surface of the movable frame side wall 51 by the generally U-shaped latch guide 144, but in this case member 143, as viewed in Fig. 3, is generally S-shaped.

Further, in this case the latching bar 146 is mounted at the lower end of the latch member 143 and extends laterally toward the deal tray side wall 76, with the latching block 148 being mounted on the deal tray side wall 76 for engagement by latching bar 146. Still further, the cam roller 145 is mounted at the upper end of latch member 143 and extends laterally through a slotted opening 149 in movable frame side wall 51, with roller 145 projecting toward the stationary frame side wall 37 and with the cam member 147 being mounted on the inner surface of stationary frame side wall 37 for engagement by roller 145.

As shown in Fig. 5, the cam member 147 is similarly provided with a forwardly downwardly angled cam surface 150, and the latching block 148 is provided with a generally hook-like engaging surface 151 and also a forwardly downwardly angled cam surface 152 positioned forwardly of surface 151. In this case, however, the various parts of assembly 132 are positioned so that the latching bar 146 engages the engaging surface 151 of latching block 148 when the deal tray 35 reaches the forward end of its forward movement within the movable frame 34.

As before stated, the various parts of the stationary frame-movable frame latch assembly 131 and the movable frame-deal tray latch assembly 132 are positioned along the stationary frame side walls 37 and 38, movable frame side walls 51 and 52 and deal tray side walls 76 and 77 so that the movable frame 34 is locked to the stationary frame 33 until the deal tray 35 reaches its forwardmost position within the movable frame 34, at which time the movable frame 34 is released from the stationary frame 33 and the deal tray 35 is locked to the movable frame 34, with the opposite latching and releasing operations taking place when the movable frame 34 has once again moved to its retracted position and prior to the deal tray 35 moving from its forwardmost position rearwardly. The action of these latch assemblies 131 and 132 will be hereinafter described more in detail in conjunction with the description of operation of the entire construction which follows.

As shown in Figs. 3, 4, 5 and 6, when the construction comprising the present invention is in its fully retracted position the confines of the tray or receptacle portion 79 of the deal tray 35 are accessible through the counter opening 32, so that papers and money may be inserted therein or removed therefrom. Further, the operating handle 92 is at the rearward end of the counter slot 93, with the chain connecting bracket 95 and chain connecting block 99 being spaced forwardly of sprocket member 103 but in close proximity thereof, and with the chain connecting block 119 on operating chain 112 being spaced downwardly below the top strand of chain 112 and around a portion of the circumference of sprocket member 113.

Thus, the chain connecting block 119 and connecting link 120 retain the deal tray 35 in its rearmost position against the bumper assembly 125. Also, at this time, as shown in Figs. 6 and 7, the stationary frame-movable frame latch assembly 131 is engaged, that is, with the latching bar 136 on the movable frame 34 engaged against the engaging surface 141 of the latching block 140 on the stationary frame 33.

Additionally, as shown, the cam member 138 of latch assembly 131, which cam member is mounted on the deal tray 35, is spaced rearwardly of the cam roller 135 on latch member 133, since deal tray 35 is in its rearmost position. Finally, the movable frame-deal tray latch assembly 132 is in disengaged position, with the cam roller 145 being positioned near the higher or rearward end of the cam member 147 on the stationary frame 33 holding the latch member 143 on the movable frame 34 in raised position, and with the latching block 148 on the deal tray 35 being spaced rearwardly from the latching bar 146, again since the deal tray 35 is in its rearmost position.

When it is desired to move the construction so that the tray portion 79 of deal tray 35 is accessible to a customer at the outer side of the main frame front wall 28, the portion of the handle 92 projecting above the counter 27 is grasped by the teller positioned at the inner side of counter 27, with this handle being moved forwardly. Forward movement of handle 92 moves the chain connecting block 99 forwardly rotating the operating chain 102 in a clockwise direction, as shown in Fig. 4, with this clockwise motion being transmitted through shaft 107 to the inner sprocket member 109.

As shown in Fig. 6, clockwise movement of sprocket member 109 rotates the operating chain 112 and consequently the sprocket member 113 in a clockwise direction, thereby moving the chain connecting block 119 clockwise around the periphery of sprocket member 113 and forwardly away from this sprocket member. This forward motion of chain connecting block 119 is transmitted through the pivotally connected connecting link 120 to the deal tray 35, thereby moving the deal tray forwardly on rollers 87, 88, 89 and 90 within the movable frame 34.

The stationary frame-movable frame latch assembly 131 at this time is engaged, so that the movable frame 34 remains stationary, locked to the stationary frame 33, since the cam member 138 of this latch assembly, which is positioned on the deal tray 35, is still spaced rearwardly from the latching bar 136 of the latch assembly. Thus, the deal tray 35 moves forwardly with reference to movable frame 34 and stationary frame 33, while the front end member 63, plate 64 and bumper and sealing member 66 of the movable frame 34 retain the opening 30 in the main frame front wall 28 closed and sealed.

During this portion of the movement of the construction, the deal tray 35 is moving from the position shown in Figs. 5 and 6 to the position shown in Fig. 9. Further, since the tray portion 79 of deal tray 35 is moving forwardly, the cover portion 85 of the deal tray begins to close the counter opening 32 and when the deal tray 35 is in its forward position as shown in Fig. 9 the cover portion 85 substantially closes the counter opening 32.

As the deal tray 35 approaches its forwardmost position shown in Fig. 9, the cam surface 139 of the cam member 138, mounted on and moving forwardly with the deal tray 35, begins to engage the cam roller 135 on the movable frame 34, so that disengagement of the stationary frame-movable frame latch assembly 131 begins, as shown in Fig. 12. Further, at the same time, as shown in Fig. 11, the latching block 148 on the deal tray 35 has moved forwardly with the deal tray to move under the latching bar 146 on the movable frame 34, so that the movable frame-deal tray latch assembly 132 is very closely approaching a position in which it may engage.

As the deal tray 35 reaches its forwardmost position the resilient bumper assembly 126 thereof strikes the movable frame front end member 63, thereby bringing the deal tray to a cushioned stop in the position shown in Fig. 9. Furthermore, the continued forward urging of the operating handle 92 transmits a forward force through the deal tray 35 to the movable frame 34, beginning to urge the movable frame outwardly through the opening 30 in the main frame front wall 28 toward its extended position.

At the moment that the deal tray 35 reaches its forwardmost position abutting the movable frame front end member 63 in the position shown in Fig. 9, the stationary frame-movable frame latch assembly 131 has reached its completely unlatched position as shown in Fig. 14 in which the cam roller 135 on the movable frame 34 has moved upwardly along the cam surface 139 of cam member 138 on the deal tray 35, thereby moving the latching bar 136 upwardly and raising the latching bar 136 from engagement with the engaging surface 141 of latching block 140 on the stationary frame 33. Thus, the movable frame 34 is at this point free to move outwardly with reference to stationary frame 33.

Furthermore, as shown in Fig. 13, the latching block 148 on the deal tray 35 has moved forwardly so that the engaging surface 151 of this latching block underlies the latching bar 146 of latch member 143, thereby placing the parts of the movable frame-deal tray latch assembly 132 in position to engage. Still further, with forward motion of the movable frame 34 with reference to the stationary frame 33, the cam roller 145 on and moving with the movable frame will roll down the cam surface 150 of the cam member 147 on and remaining stationary with the stationary frame, permitting the latch member 143 and consequently the latching bar 146 to move downwardly, so that this latching bar on the movable frame engages the latching block 148 on the deal tray 35 locking the deal tray and movable frame together.

Thus, the forward force transmitted from handle 92 to deal tray 35 and ultimately to movable frame 34 begins to move the movable frame outwardly toward extended position between the position shown in Fig. 9 to the fully extended position shown in Fig. 10. As before described, the movable frame 34 moves with reference to the stationary frame 33 by means of the forward set of stationary rollers 49 and 50 and the rearward set of movable rollers 47 and 48, and since the tracks 59 and 60, within which the rear movable rollers 47 and 48 roll and are guided, is angled slightly forwardly downwardly, the rearward end of movable frame 34 is moved slightly downwardly with reference to the forward stationary rollers 49 and 50. For this reason, as the movable frame 34 moves to its extended position, as shown in Fig. 10, the forward end thereof is tilted slightly upwardly.

Further, as the movable frame 34 moves outwardly through the opening 30 in the main frame front wall 28, since there is no relative movement between the movable frame 34 and the deal tray 35, but rather only relative movement between the movable frame and stationary frame 33, the stationary frame-movable frame latching bar 136 on the movable frame 34 remains in raised position, as shown in Fig. 16, being held upwardly by the cam roller 135 on the movable frame and the cam member 138 on the deal tray 35. Therefore, as shown in Fig. 16, the latching bar 136 moves forwardly with movable frame 34 away from the latching block 140 on the stationary frame 33.

Still further, at this point, as shown in Fig. 15, the movable frame-deal tray latching bar 146 on the movable frame 34 has engaged with the engaging surface 151 of the latching block 148 on the deal tray 35, thereby locking the movable frame and deal tray together. This locking is permitted by the cam roller 145 on and moving with the movable frame 34 rolling down the cam surface 150 of the cam member 147 on the stationary frame 33.

Also, as the movable frame 34 moves outwardly through the frame opening 30 in the main frame front wall 28, the counter opening 32 is, at the beginning of this movement, closed by the deal tray cover portion 85, and as this movement progresses is then closed by the movable frame top wall 54. The cover plate 70, slidably mounted at the upper edges of the stationary frame side walls 37 and 38, remains stationary, with the movable frame top wall 54 sliding therebeneath until the tabs 75 on the movable frame 34 engage the cover plate front tabs 74.

At this time, as the movable frame 34 continues in its forward motion, the top wall 54 thereof continues to move forwardly, but now wall 54 has engaged and is sliding the cover plate 70 with it and with reference to the stationary frame side walls 37 and 38. Thus, when the movable frame 34 reaches its fully extended position as shown in Fig. 10, the counter opening 32 is closed, partially by the rearward portion of the movable frame top wall 54 and partially by the forward portion of the cover plate 70.

As the movable frame 34 reaches the forward extent of its forward movement, that is, the position shown in Fig. 10, the chain connecting bracket 95 connected to operating handle 92 will engage the bumper assembly 130 mounted on the outer surface of the stationary frame side wall 37, thereby stopping forward movement of handle 92 and also stopping the forward movement of the movable frame 34, bringing this movable frame to a cushioned stop. If the side of the customer's automobile (not shown) happens to be positioned sufficiently close to the main frame front wall 28 so that the full forward movement of movable frame 34 is not permitted, the resilient bumper and sealing member 66 at the forward end of the movable frame will prevent damage to the customer's automobile even though the movable frame strikes the side of the automobile.

One of the important features of the construction comprising the present invention that should be pointed out is that, despite the amount of extension by the movable frame 34 that is permitted, that is, either full extension or any intermediate position, the deal tray 35, and particularly the tray portion 79 thereof, is always positioned at the forwardmost end of the movable frame 34. This is accomplished by the fact that the deal tray 35 is always moved to the forward end of the movable frame 34 prior to any extension of the movable frame, and this deal tray 35 remains in its forward position during the entire extension of the movable frame 34.

After the customer has inserted the desired papers or money into the receptacle portion 79 of the deal tray 35 or has removed papers or money therefrom, the teller merely pulls the operating handle 92 rearwardly to start the movable frame 34 and deal tray 35 moving rearwardly from the position shown in Fig. 10 toward the position shown in Fig. 9. This rearward motion is transmitted from operating handle 92 to the deal tray 35 by the mechanism hereinbefore described, and since the movable frame-deal tray latch assembly 132 is still in latching or locking position, the movable frame 34 and deal tray 35 must move rearwardly together.

Since, as before described, due to the particular roller mounting of the movable frame 34 for movement within the stationary frame 33, the forward end of the movable frame is tilted slightly upwardly on its outward or extending motion so that, instead of the entire downwardly directed forces caused by the weight of the movable frame 34 and the deal tray 35 having to be overcome as would be the case in normal mounting, certain of the components of these forces are directed rearwardly along the line of movement of the movable frame 34. Thus, less force is required for starting the rearward movement of movable frame 34 and for moving the movable frame to its fully retracted position within the stationary frame 33.

As the movable frame and deal tray approach the position shown in Fig. 9, the stationary frame-movable frame latch assembly 131 is in the position shown in Fig. 16 and the movable frame-deal tray latch assembly 132 is in the position shown in Fig. 15. As the movable frame and deal tray reach the position shown in Fig. 9, the latching bar 136 on the movable frame 34 assumes a position overlying the engaging surface 141 of the latching block 140 on the movable frame 33, as shown in Fig. 14.

Also, the cam roller 145 on the movable frame 34 has engaged and rolled up the cam surface 150 of cam member 147 on the stationary frame 33, thereby moving the latching bar 146 on the movable frame upwardly and disengaged from the engaging surface 151 of the latching block 148 on the deal tray 35, as shown in Fig. 13. Thus, the stationary frame-movable frame latch assembly 131 is once again ready to engage, as shown in Fig. 14, and the movable frame-deal tray latch assembly 132 has once again disengaged, as shown in Fig. 13.

The movement of the movable frame 34 into its fully retracted position as shown in Fig. 9 is cushioned by the rearwardly extending leg 68 of the bumper and sealing member 66 at the front of the movable frame 34 striking the main frame flange 45 around the opening 30, with this bumper and sealing member 66 also cooperating with the movable frame front plate 64 to seal the main frame opening 30. Cushioning of the rearward stopping of the movable frame 34 is also aided by the one or more resilient bumper members 69 positioned on the stationary rear wall 39 being abutted by the rear portion of the movable frame 34.

During the initial portion of the rearward movement of the movable frame 34 from the position shown in Fig. 10 to the position shown in Fig. 9, the cover plate 70, slidably mounted on the stationary frame side walls 37 and 38, will remain in its position shown in Fig. 10 partially closing the counter opening 32, while the movable frame top wall 54 moves rearwardly therebeneath. Intermediate this rearward movement of movable frame 34, the tabs 75 on the movable frame will engage the rear tabs 73 on the cover plate 70 and will begin to move the cover plate 70 from its position shown in Fig. 10 toward its position shown in Fig. 9.

Thus, at this moment the counter opening 32 will be closed by the cover plate 70 overlying the rear portion of the movable frame top wall 54 and the front portion of the top wall 54. As the deal tray reaches its fully retracted position as shown in Fig. 9, the cover plate 70 and the movable frame top wall 54 will have moved rearwardly away from beneath the counter opening 32, and the deal tray cover portion 85 will have once again moved to a position underlying the counter opening 32 and still maintaining the counter opening substantially closed.

Continued rearward movement of the operating handle 92 causes the deal tray 35 to move from the position shown in Fig. 9 to the position shown in Figs. 5 and 6. This rearward movement of deal tray 35 with reference to movable frame 34 is permitted since the movable frame-deal tray latch assembly 132 is disengaged and the latching block 148 on the deal tray 35 may pass beneath and move away from the latching bar 146 on the movable frame 34, as shown in Fig. 11.

Further, during the initial movement of the deal tray 35 from its position shown in Fig. 9 to its fully retracted position shown in Figs. 5 and 6, the cam member 138 on the deal tray 35 moves rearwardly with reference to the cam roller 135 on the movable frame 34, so that this cam roller rolls down the cam surface 139 on the cam member 138, lowering the latching bar 136 on the movable frame 34, and causing this latching bar to reengage the engaging surface 141 of the latching block 140 on the stationary frame 33. Thus, the stationary frame-movable frame latch assembly 131 is once again engaged, locking the movable frame 34 in its fully retracted position within the stationary frame 33.

Finally, as the deal tray 35 reaches its fully retracted position as shown in Figs. 5 and 6, with the cover portion thereof rearwardly of the counter opening 32 and with the receptacle or tray portion 79 thereof underlying the counter opening 32 so that this receptacle portion is accessible to the teller, the deal tray is brought to a cushioned stop by the bumper assembly 125 striking the deal tray channel member 122. Furthermore, the rearward movement of deal tray 35 within the movable frame 34 is aided by the tension spring 129 secured between the movable frame 34 and deal tray 35, with this tension spring also insuring that the deal tray returns to its fully retracted position against bumper assembly 125 and properly underlying the counter opening 32.

The second embodiment of the construction comprising the present invention is shown in Figs. 17 and 18 and merely comprises the replacement of the slidable cover 70 mounted on the stationary frame side walls 37 and 38 with a flexible cover. This flexible cover may be formed of any suitable material such as, for instance, plastic or cloth.

As shown in Figs. 17 and 18, the flexible cover 153 is secured at one end to the rear edge of the movable frame top wall 54, as at 154, and is secured at the other end to the undersurface of the counter 27, as at 155. The point of attachment 155 of the curtain 153 to the undersurface of the counter 27 is intermediate the space between the counter opening 32 and the rearmost edge of the counter, with this point 155 preferably being the midpoint of the path of travel of the rearward edge of movable frame 34 between its fully retracted and fully extended positions.

Thus, as shown in Fig. 17, when the movable frame 34 moves forwardly toward fully extended position, when the rearmost edge of the top wall 54 thereof moves past the rear edge of the counter opening 32, the counter opening will still be maintained closed partially by the main frame top wall 54 and partially by curtain 153. Furthermore, as shown in Fig. 18, when the main frame 34 is in fully retracted position the curtain 153 will overlie this movable frame top wall 54.

Therefore, whether the first embodiment slidable cover plate 70 is provided or the second embodiment flexible curtain 153 is provided, the counter opening 32 is at all times maintained closed when the deal tray receptable portion 79 does not underlie this opening. This prevents papers and money from falling into the confines of the deal drawer construction rearwardly of the deal tray 34 and also prevents air from passing through the construction from the customer's side to the teller's side when the movable frame 34 is extended.

The third embodiment of the construction comprising the present invention is shown in Figs. 19, 20 and 21 and illustrates the adaption of the deal drawer construction for automatic or motorized operation. Comparing the first embodiment hand operated construction, as shown in Fig. 4, with this third embodiment motorized construction, as shown in Fig. 20, the principal change is that the handle 92, guide roller assembly 94—96—97— 98, guide bar assembly 100—101, connecting members 95 and 99, the operating chain 102 and the sprockets 103 and 104, as shown in Fig. 4, are removed and replaced by an electric drive motor 156, V-belt pulleys 157 and 158 and a V-belt 159 with the necessary mounting therefor as shown in Fig. 20.

Referring to Figs. 19, 20 and 21, the drive motor 156 is mounted with the shaft 160 thereof extending generally vertically downwardly, with the drive motor mounted on a laterally outwardly extending leg 161 of a generally L-shaped bracket 162. The other leg 163 of bracket 162 is pivotally mounted to the outer surface of the stationary frame side wall 37 by means of a pivot pin 164 suitably connected to side wall 37.

Bracket 162 is provided at its upper end with a laterally extending abutment member 165, projecting laterally away from the stationary side wall 37 intermediate the length of the bracket leg 163. Thus, as best seen in Fig. 20, abutment member 165 is spaced above the pivot pin 164, and the shaft 160 of drive motor 156 is spaced below pivot pin 164.

A generally U-shaped mounting bracket 166 is mounted against the outer surface of the stationary frame side wall 37 spaced rearwardly from the abutment member 165 of bracket 162, as best seen in Figs. 19 and 20. Bracket 166 is in horizontal alignment with abutment member 165 having the spaced forward and rearward horizontally aligned legs 167 and 168 extending laterally from the stationary frame side wall 37.

A push rod 169 is mounted with the rearward end thereof slidably received through the forward leg 167 of mounting bracket 166 and with the forward end of rod 169 slidably received through abutment member 165, as shown. A flange member 170 is secured surrounding rod 169 spaced rearwardly from abutment member 165 with a compression spring 171 also being mounted surrounding push rod 169 between flange member 170 and the rearward surface of abutment member 165.

An adjustment screw 172 is threadably received through the rearward leg 168 of mounting bracket 166, with the forward end of this screw abutting and bearing against the rearward end of push rod 169, rearwardly of the mounting bracket forward leg 167. Thus, a forward force may be brought to bear against the abutment member 165, through compression spring 171, flange member 170, push rod 169, from the adjustment screw 172, with this force tending to rotate the motor bracket 162 and consequently the drive motor 156 around the pivot pin 164 in a clockwise direction as viewed in Fig. 20.

A speed-reducing assembly 173 is operatively mounted on the motor shaft 160 and in turn operatively mounts the V-belt pulley 157 in alignment with V-belt pulley 158. The V-belt pulley 158 is mounted on shaft 107, which shaft extends laterally into the confines of the unit, as hereinbefore described, and a V-belt 159 is tensioned between pulleys 157 and 158.

Thus, this motor drive unit of the third embodiment, as above described, merely replaces the hand operating mechanism described in the first embodiment, and in both cases the mechanisms are used for rotating the shaft 107 to operate the operating chain 112 and consequently move the deal tray 35 and movable frame 34 forwardly and rearwardly by means of the pivoted connecting link 120. The movement of the deal tray 35 and movable frame 34, as well as the action of the stationary frame-movable frame latch assembly 131 and movable frame-deal tray latch assembly 132, is identical in both cases, whether hand or motor operated, so that the change between this hand and motorized mechanism is relatively simple.

The drive motor 156 is a reversible motor and is controlled by the three-position hand switch 174 and the conventional limit switch 175. Hand switch 174 is operatively wired to the drive motor 156 and the operating lever 176 thereof is movable vertically between three positions, the middle position or "off" position being shown in Figs. 20 and 21.

Preferably, hand switch 174 is mounted on an L-shaped bracket 177 secured to the stationary frame side wall 37 at the rearward end of this side wall, as shown, and above the push rod 169 and adjustment screw 172. The operating lever 176 of switch 174 is preferably vertically movable upwardly for operating motor 156 to turn the pulleys 157 and 158 and V-belt 159 in a clockwise direction.

Still further, lever 176 of switch 174 is preferably movable downwardly to operate motor 165 to turn the pulleys and V-belt in a counterclockwise direction, with the "off" position of lever 176 being midway between the "on" positions as above described. Also, the upward position of operating lever 176 is preferably one which must be held by the operator in order to maintain the lever in this position, that is, to keep the lever from returning to the middle "off" position, whereas the lower "on" position is preferably a set position into which lever 176 may be moved and will remain until moved therefrom, with the purpose of this particular construction of switch 175 being hereinafter more clearly explained.

The limit switch 175 is secured to the generally L-shaped bracket 178, which bracket is attached to the stationary frame side wall 38, as shown, and switch 175 is provided with an actuating lever 179 positioned to contact an actuating plate 180 mounted on the deal tray down-channel member 122. Finally, limit switch 175 is operatively wired to drive motor 156 so that switch 175 will interrupt the flow of power to motor 156 when the actuating lever 179 thereof is contacted by the deal tray actuating plate 180 as the deal tray 35 moves rearwardly and at that time the operating lever 176 of hand switch 174 will be in its downwardly extending position normally causing the drive motor 156 to rotate the pulleys 157 and 158 and the V-belt 159 in a counterclockwise direction.

Thus, switches 174 and 175 are operatively arranged and connected to drive motor 156 so that when the operating lever 176 of switch 174 is moved upwardly, drive motor 156 will rotate pulleys 157 and 158 and V-belt 159 in a clockwise direction, thereby moving the deal tray 35 forwardly in the movable frame 34 and ultimately extending the movable frame 34 forwardly to extended position, as hereinbefore described with reference to the hand operation thereof. As soon as deal tray 35 has moved from its rearward position forwardly toward the front of the movable frame 34, the actuating plate 180 will move from beneath and from engagement with the actuating lever 179, thereby permitting limit switch 175 to close and maintain a completed circuit therethrough.

When the movable frame 34 has reached its fully extended position, as hereinbefore described, the operating lever 176 of switch 174 is merely released to stop the drive motor 156, since the lever 176 is arranged to automatically move back to its middle or "off" position when not held in its upper "on" position. This arrangement also serves as a safety measure since lever 176 must always be positively held in its up position in order to move the movable frame 34 outwardly, thereby preventing the lever from being accidentally bumped and moving the movable frame outwardly when the teller, at the inner side of the window, is not aware of it.

Another safety feature of the construction is provided by the particular arrangement of the mounting of the operating motor 156 and the manner in which tension is applied to the V-belt 159. Since, merely by adjusting the adjustment screw 172, the drive motor 156 may be pivoted around the pivot pin 164, a predetermined amount of tension may be applied to the V-belt 159.

With this arrangement, therefore, it is possible to set the tension in V-belt 159 only slightly higher than the amount required to provide sufficient friction between V-belt 159 and pulleys 157 and 158 to extend and retract the movable frame 34 and deal tray 35. Thus, if the movable frame 34 and deal tray 35 meet resistance in their inward or outward movement, such as from a money bag not being properly placed completely within the deal tray 35, from a customer having a hand still within deal tray 35 or from the forward end of the movable frame 34 striking the side of an automobile or reaching its forward extent of movement, the V-belt 159 will slip on the pulleys 157 and 158 until operating motor 165 is turned off.

When the movable frame 34 is retracted, this movable frame first seats in its fully retracted position, as before described, and then the deal tray 35 moves rearwardly to its rearward position. This motion is accomplished by the operating lever 176 being moved to its downward "on" position so that the operating motor 156 rotates the pulleys 157 and 158 and V-belt 159 in a counterclockwise direction.

As the deal tray 35 reaches the rearward extent of its motion, the actuating plate 180 moving with the deal tray engages the actuating lever 179 of limit switch 175 so that lever 179 is moved upwardly, breaking the electrical circuit through switch 175 and therefore interrupting the flow of power to operating motor 156. Because of the provision of limit switch 175 for breaking the circuit at the rearward end of movement of the deal tray 35, the operating lever 176 of hand switch 174 may be arranged as before described so that this lever in its downward position will remain in this position without being held, since the limit switch 175 will always interrupt the flow of power to operating motor 156 at the proper time.

Also, as shown, it is preferred that the actuating plate 180 on deal tray 35 is arranged to strike the actuating lever 179 of switch 175 at a point at which the deal tray 35 is still spaced forwardly from its rearmost position, so that the momentum of deal tray 35 will carry it to its rearwardmost position without the aid of operating motor 156 during this final period. With this arrangement the deal tray 35 comes to a more cushioned stop since it has lost some of its momentum.

Finally, this third embodiment may also include an emergency hand crank mechanism for moving the movable frame 34 and deal tray 35 in the event of power failure. This hand crank mechanism is generally indicated at 181 and may include a socket member 182 rotatably mounted in a bracket 183 and operatively connected to a pair of bevel gears 184 and 185.

Gear 185 may in turn be rotatably mounted on bracket 183 and operatively connected through a shaft 186 to the inner rear sprocket member 113. Thus, in the event of power failure, socket member 182 may be turned by a crank (not shown), to turn sprocket member 113 in the proper direction to accomplish the desired movement of movable frame 34 and deal tray 35.

Obviously, because of the simple means of adapting the deal drawer construction comprising the present invention to a motorized construction as set forth in the foregoing third embodiment, the remaining portions of the construction are unchanged, whether hand or motor operated. Thus, the same basic construction may be used, whether it is desired to finally provide a hand or motor driven construction, and therefore the production of both hand and motorized construction is greatly simplified.

Thus, in all embodiments, according to the principles of the present invention and despite the driving means, the deal tray 35 is first moved forwardly within the movable frame 34 and the movable frame is retained locked within the stationary frame 33 until the deal tray has reached the forward end of the movable frame. Further, in all embodiments the deal tray 35 is then locked to the movable frame 34 and the movable frame is unlocked from the stationary frame 33 so that the movable frame may then be extended outwardly through the opening 30 in the main frame front wall 28, with the deal tray 35 in a convenient forward position for access by the customer.

Still further, in all embodiments, as the movable frame 34 moves to extended position, the forward end thereof is tilted upwardly, caused by the rearward end thereof being tilted slightly downwardly. Thus, less force is required for beginning and continuing the retracting motion of movable frame 34 because certain of the force components caused by the weight thereof are directed rearwardly due to this upward tilting.

Still further, in all embodiments the movable frame 34 is retained locked in its retracted position so that the front portion of the movable frame retains the opening 30 in the main frame front wall 28 closed unless and until the deal tray 35 has moved to its forwardmost position at the forward end of movable frame 34. For this reason, the movable frame 34 may never be moved outwardly, whether accidentally or otherwise, until the deal tray 35 has been purposely moved to the forward end of the movable frame.

Also, in all embodiments of the present invention the counter opening 32 is always maintained closed any time that the tray portion 79 of deal tray 35 is not underlying this opening so that objects cannot accidentally fall through the opening into the confines of the deal drawer construction nor can air blow inwardly through this counter opening when the movable frame 34 is extended. Finally, as hereinbefore described, the operating mechanism for the deal drawer construction comprising the present invention is of the utmost simplicity and requires relatively simple alteration to adapt the construction for either hand or motor operation.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the improved construction, illustrated and described herein, are by way of example and the scope of the present invention is not limited to the exact details of construction shown.

Having now described the invention, the constructions, operation and use of preferred embodiments thereof, and the advantageous new and useful results obtained thereby, the new and useful construction and reasonable mechanical equivalents thereof obvious to those skilled in the art are set forth in the appended claims.

I claim:

1. In deal drawer construction for use in a bank drive-up window of the type having an upstanding wall provided with outer and inner sides and having a teller's counter provided with an opening spaced inwardly of the inner side of said wall; the combination of a stationary deal drawer frame mounted beneath the counter, a movable frame mounted on the stationary frame, the movable frame having a front and rear portion and a front end member on said front portion, the wall being provided with a deal drawer opening; means mounting the movable frame on the stationary frame for movement outwardly through said deal drawer opening to an extended position in which the front portion is located outwardly of the outer side of the wall with the front end member spaced outwardly from the outer side of the wall, and for movement inwardly to a retracted position in which only said front end member is accessible at the outer side of said wall; deal tray means movably mounted on said movable frame; means mounting the deal tray means for movement on the movable frame between a forward position in the front portion of the movable frame, and a rearward position in the rear portion of the movable frame, the deal tray means being forward of the counter opening and substantially inaccessibly covered by the counter in the forward position when the movable frame is in retracted position, the deal tray means being beneath and at least partially aligned with and accessible through said counter opening in rearward position when the movable frame is in retracted position; releasable holding means engaged with the movable frame holding the movable frame immovable when the movable frame is in retracted position; operating means for the movable frame and deal tray means including an actuator accessible to the teller and drive connections with the movable frame and deal tray for moving the movable frame between extended and retracted positions and for moving the deal tray means between rearward and forward positions, said operating means also including a member engageable with the releasable holding means for releasing said holding means; said operating means member being free of engagement with the releasable holding means except when the deal tray means is moved into forward position; the operating means being operable to move the deal tray means from rearward to forward position, to release the holding means when the deal tray means is in forward position and to then move the deal tray means from retracted to extended position.

2. In deal drawer construction for use in a bank drive-up window of the type having an upstanding wall provided with outer and inner sides and having a teller's counter provided with an opening inwardly of the inner side of said wall; the combination of a stationary deal drawer frame mounted beneath the counter, a movable frame mounted on the stationary frame, the movable frame having a front and rear portion and a front end member on said front portion, the wall being provided with a deal drawer opening; means mounting the movable frame on the stationary frame for movement outwardly through said deal drawer opening to an extended position in which the front portion is located outwardly of the outer side of the wall with the front end member spaced outwardly from the outer side of the wall, and for movement inwardly to a retracted position in which only said front end member is accessible at the outer side of said wall; deal tray means movably mounted on said movable frame; means mounting the deal tray means for movement on the movable frame between a forward position in the front portion of the movable frame, and a rearward position in the rear portion of the movable frame, the deal tray means being accessible through said counter opening at least when said deal tray means is in said rearward position with said movable frame in retracted position; releasable holding means engaged with the movable frame holding the movable frame immovable when the movable frame is in retracted position; operating means for the movable frame and deal tray means including an actuator accessible to the teller and drive connections with the deal tray means and through the deal tray means with the movable frame for moving the deal tray means between rearward and forward positions and for moving the movable frame between extended and retracted positions, said operating means also including a member engageable with the releasable holding means for releasing said holding means, said operating means member being free of engagement with the releasable holding means except when the deal tray means is moved into forward position; the operating means being operable to move the deal tray means from rearward to forward position, to release the holding means when the deal tray means is in forward position and to then move the deal tray means and movable frame from retracted to extended position.

3. In deal drawer construction for use in a bank drive-up window of the type having an upstanding wall provided with outer and inner sides and having a teller's counter provided with an opening inwardly of the inner side of said wall; the combination of a stationary deal drawer frame mounted beneath the counter, a movable frame mounted on the stationary frame, the movable frame having a front and rear portion and a front end member on said front portion, the wall being provided with a deal drawer opening; means mounting the movable frame on the stationary frame for movement outwardly through said deal drawer opening to an extended position in which the front portion is located outwardly of the outer side of the wall with the front end member spaced outwardly from the outer side of the wall, and for movement inwardly to a retracted position in which only said front end member is accessible at the outer side of said wall; deal tray means movably mounted on said movable frame; means mounting the deal tray means for movement on the movable frame between a forward position in the front portion of the movable frame, and a rearward position in the rear portion of the movable frame, the deal tray means being accessible through said counter opening at least when said deal tray means is in said rearward position with said movable frame in retracted position; releasable holding means engaged with the movable frame holding the movable frame immovable when the movable frame is in retracted position; operating means for the movable frame and deal tray means including an actuator accessible to the teller and drive connections with the movable frame and deal tray means for moving the movable frame between extended and retracted positions and for moving the deal tray means between rearward and forward positions, said operating means also including a member engageable with the releasable holding means for releasing said holding means, said operating means member being free of engagement with the releasable holding means except when the deal tray means is moved into forward position; the operating means being operable to move the deal tray means from rearward to forward position, to release the holding means when the deal tray means is in forward position and to then move the deal tray means and movable frame from retracted to extended position.

4. Deal drawer construction as defined in claim 3 in which the releasable holding means is a first releasable holding means engaged with the movable frame holding the movable frame immovable when in retracted position; in which a second releasable holding means is engaged with the deal tray means holding the deal tray means immovable with respect to the movable frame when the deal tray means is in forward position and the movable frame is moved from retracted position; in which the operating means includes a first member engageable with the first releasable holding means for releasing said first holding means; in which said operating means first member is free of engagement with the first releasable holding means except when the deal tray means is moved into forward position; in which the operating means also includes a second member engageable with the second releasable holding means for releasing said second holding means; in which said operating means second member is engaged with the second releasable holding means except when the deal tray means is moved into forward position and the movable frame is moved from retracted position; and in which the operating means is operable to move the deal tray means from rearward to forward position, to release the first holding means when the deal tray means is in forward position, to then move the deal tray means and movable frame from retracted to extended position, and to disengage the operating means second member from the second releasable holding means as the movable frame is moved from retracted position.

5. Deal drawer construction as defined in claim 4 in which the first releasable holding means includes a first releasable latch member engaged between the movable frame and stationary frame; in which the operating means first member includes a member operably connected to the deal tray means and engageable with the first releasable latch member when the deal tray means is moved into forward position; in which the second releasable holding means includes a second releasable latch member engaged between the deal tray means and movable frame; and in which the operating means second member includes a member operably connected to the stationary frame and engageable with the second releasable latch member except when the deal tray means is moved into forward position and the movable frame is moved from retracted position.

6. Deal drawer construction as defined in claim 4 in which the first releasable holding means includes a first slidable latch member engaged between the movable frame and stationary frame; in which the operating means first member includes a first cam member mounted on the deal tray means engageable with the first slidable latch member moving said first latch member from engagement between the movable frame and stationary frame when the deal tray means is moved into forward position; in which the second releasable holding means includes a second slidable latch member engaged between the deal tray means and movable frame; and in which the operating means second member includes a second cam member mounted on the stationary frame engageable with the second slidable latch member maintaining said second latch member from engagement between the deal tray means and movable frame except when the deal tray means is moved into forward position, and the movable frame is moved from retracted position.

7. Deal drawer construction as defined in claim 3 in which the releasable holding means includes a releasable latch member engaged between the movable frame and stationary frame; in which the operating means member includes a member operably connected to the deal tray means and engageable with the releasable latch member when the deal tray means is moved into forward position.

8. Deal drawer construction as defined in claim 3 in which the releasable holding means includes a slidable latch member normally engaged between the movable frame and stationary frame; and in which the operating means member includes a cam member mounted on the deal tray means engageable with the slidable latch member moving the latch member from engagement between the movable frame and stationary frame when the deal tray means is moved into forward position.

9. In deal drawer construction for use in a bank drive-up window of the type having an upstanding wall provided with outer and inner sides and having a teller's counter provided with an opening spaced inwardly of the inner side of said wall; the combination of a stationary deal drawer frame mounted beneath the counter, a movable frame mounted on the stationary frame, the movable frame having a front and rear portion and a front end member on said front portion, the wall being provided with a deal drawer opening; means mounting the movable frame on the stationary frame for movement outwardly through said deal drawer opening to an extended position in which the front portion is located outwardly of the outer side of the wall with the front end member spaced outwardly from the outer side of the wall, and for movement inwardly to a retracted position in which only said front end member is accessible at the outer side of said wall; deal tray means movably mounted on said movable frame; means mounting the deal tray means for movement on the movable frame between a forward position in the front portion of the movable frame, and a rearward position in the rear portion of the movable frame, the deal tray means being forward of the counter opening and substantially inaccessibly covered by the counter in the forward position when the movable frame is in retracted position, the deal tray means being beneath and at least partially aligned with and accessible through said counter opening in the rearward position when the movable frame is in retracted position; first cover means operably connected to the deal tray means movable with said deal tray means for substantially closing the counter opening when the deal tray means is moved to forward position and the movable frame is in retracted position; second cover means operably connected to the movable frame and movable with the movable frame for substantially closing the counter opening when the deal tray means is in forward position and the movable frame is moved outwardly through the deal drawer opening to extended position; releasable holding means engaged with the movable frame holding the movable frame immovable when the deal tray means is in retracted position; operating means for the movable frame and deal tray means including an actuator accessible to the teller and drive connections with the movable frame and deal tray means for moving the movable frame between extended and retracted positions and for moving the deal tray means between rearward and forward positions, said operating means also including a member engageable with the releasable holding means for releasing said holding means; said operating means member being free of engagement with the releasable holding means except when the deal tray means is moved into forward position; the operating means being operable to move the deal tray means from rearward to forward position, to release the holding means when the deal tray means is in forward position and to then move the deal tray means from retracted to extended position.

10. Deal drawer construction as defined in claim 9 in which the second cover means includes a cover member slidably mounted on the stationary frame; and in which there is means operably connecting said cover member to the movable frame for movement by the movable frame forwardly to a position at least partially covering the counter opening when the movable frame moves to extended position and for movement rearwardly away from said counter opening when the movable frame moves inwardly to retracted position.

11. Deal drawer construction as defined in claim 9 in which the second cover means includes flexible curtain means connected to the movable frame for movement by the movable frame forwardly to a position at least partially covering the counter opening when the movable frame moves to extended position and rearwardly away from said counter opening when the movable frame moves inwardly to retracted position, said flexible curtain means having ends, one of the flexible curtain means ends being mounted stationary with respect to the teller's counter, and the other of said curtain means ends being connected to and movable with the movable frame.

12. In deal drawer construction for use in a bank drive-up window of the type having an upstanding wall provided with outer and inner sides and having a teller's counter provided with an opening inwardly of the inner side of said wall; the combination of a stationary deal drawer frame mounted beneath the counter, a movable frame mounted on the stationary frame, the movable frame having a front and rear portion and a front end member on said front portion, the wall being provided with a deal drawer opening; means mounting the movable frame on the stationary frame for movement outwardly through said deal drawer opening to an extended position in which the front portion is located outwardly of the outer side of the wall with the front end member spaced outwardly from the outer side of the wall, and for movement inwardly to a retracted position in which only said front end member is accessible at the outer side of said wall; deal tray means movably mounted on said movable frame; means mounting the deal tray means for movement on the movable frame between a forward position in the front portion of the movable frame, and a rearward position in the rear portion of the movable frame, the deal tray means being accessible through said counter opening at least when said deal tray means is in said rearward position with said movable frame in retracted position; the deal tray means having a front portion, said deal tray means front portion abutting the movable frame front portion when the deal tray means is in its forward position; releasable holding means engaged with the movable frame holding the movable frame immovable when the movable frame is in retracted position; operating means for the movable frame and deal tray means including an actuator accessible to the teller and drive connections with the deal tray means and through the deal tray means with the movable frame for moving the movable frame between extended and retracted positions and for moving the deal tray means between rearward and forward positions, said operating means also including a member engageable with the releasable holding means for releasing said holding means, said operating means member being free of engagement with the releasable holding means except when the deal tray means is moved into forward position; the operating means being operable to move the deal tray means from rearward to forward position, to release the holding means when the deal tray means is in forward position and to then move the movable frame through the abutment of the movable frame with the deal tray means from retracted to extended position.

13. Deal drawer construction as defined in claim 12 in which the first releasable holding means includes a first releasable latch member engaged between the movable frame and stationary frame; in which the operating means first member includes a member operably connected to the deal tray means and engageable with the first releasable latch member when the deal tray means is moved into forward position; in which the second releasable holding means includes a second releasable latch member engaged between the deal tray means and movable frame; and in which the operating means second member includes a member operably connected to the stationary frame and engageable with the second releasable latch member except when the deal tray means is moved into forward position and the movable frame is moved from retracted position.

14. In deal drawer construction for use in a bank drive-up window of the type having an upstanding wall provided with outer and inner sides and having a teller's counter provided with an opening inwardly of the inner side of the said wall; the combination of a stationary deal drawer frame mounted beneath the counter, a movable frame mounted on the stationary frame, the movable frame having a front and rear portion and a front end member on said front portion, the wall being provided with a deal drawer opening; means mounting the movable frame on the stationary frame for movement outwardly through said deal drawer opening to an extended position in which the front portion is located outwardly of the outer side of the wall with the front end member spaced outwardly from the outer side of the wall, and for movement inwardly to a retracted position in which only said front end member is accessible at the outer side of said wall; deal tray means movably mounted on said movable frame; means mounting the deal tray means for movement on the movable frame between a forward position in the front portion of the movable frame, and a rearward position in the rear portion of the movable frame, the deal tray means being accessible through said counter opening at least when said deal tray means is in said rearward position with said movable frame in retracted position; first releasable latch means engaged between the movable frame and stationary frame; first control means operably connected to the deal tray means and engageable with and releasing the first releasable latch member when the deal tray means is moved into forward position; second releasable latch means engaged between the deal tray means and movable frame; second control means operably connected to the stationary frame and engageable with and holding the second releasable latch member released except when the deal tray means is moved into forward position and the movable frame is moved from retracted position; the first relasable latch means holding the movable frame immovable in the stationary frame when said first latch means is engaged between the movable frame and stationary frame; the second releasable latch means holding the deal tray means immovable with respect to the movable frame when said second latch means is engaged between the deal tray means and movable frame; operating means for the movable frame and deal tray means including an actuator accessible to the teller and drive connections with the movable frame and deal tray means for moving the movable frame between extended and retracted positions and for moving the deal tray means between rearward and forward positions; the operating means being operable to move the deal tray means from rearward to forward position while the movable frame is maintained immovable by the first releasable latch means, to then move the deal tray means and movable frame from retracted to extended position and from extended to retracted position while the deal tray means is held immovable with respect to the movable frame by the second releasable latch means, and to then move the deal tray means from forward to rearward position while the movable frame is held immovable by the first releasable latch means.

15. Deal drawer construction as defined in claim 14 in which the first releasable latch means is a first latch member slidably mounted engaged between the movable frame and stationary frame; in which the first control means is a first cam member mounted on the deal tray means engageable with the first slidable latch member moving said first latch member from engagement between the movable frame and stationary frame when the deal tray means is moved into forward position; in which the second releasable latch means is a second latch member slidably mounted normally engaged between the deal tray means and movable frame; and in which the second control means is a second cam member mounted on the stationary frame engageable with the second slidable latch member maintaining said second latch member from engagement between the deal tray means and movable frame except when the deal tray means is moved into forward position and the movable frame is moved from retracted position.

References Cited in the file of this patent

UNITED STATES PATENTS

| | | |
|---|---|---|
| 668,078 | Baker | Feb. 12, 1901 |
| 1,184,978 | Meilink | May 30, 1916 |
| 2,496,673 | Nielsen | Feb. 7, 1950 |
| 2,630,084 | Hanson | Mar. 3, 1953 |
| 2,722,179 | Belew | Nov. 1, 1955 |
| 2,728,626 | Gussack | Dec. 27, 1955 |
| 2,730,053 | Ellithorpe | Jan. 10, 1956 |